US012688483B2

(12) United States Patent (10) Patent No.: US 12,688,483 B2

Brennan et al. (45) Date of Patent: Jul. 21, 2026

(54) COMPUTER-IMPLEMENTED SYSTEMS AND METHODS FOR A PRE-NOTE-ENABLED FILTERED TRANSACTIONS PROCESS

(71) Applicant: Fidelity Information Services, LLC, Jacksonville, FL (US)

(72) Inventors: Joyce Brennan, Jacksonville, FL (US); Midelkis S. Frases, Jacksonville, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 182 days.

(21) Appl. No.: 18/240,669

(22) Filed: Aug. 31, 2023

(65) Prior Publication Data

US 2024/0330849 A1 Oct. 3, 2024

Related U.S. Application Data

(60) Provisional application No. 63/493,172, filed on Mar. 30, 2023.

(51) Int. Cl.
*G06Q 10/087* (2023.01)
(52) U.S. Cl.
CPC .................................. *G06Q 10/087* (2013.01)
(58) Field of Classification Search
None
See application file for complete search history.

(56) References Cited

U.S. PATENT DOCUMENTS

| | | | | |
|---|---|---|---|---|
| 5,649,117 A | * | 7/1997 | Landry | ................ G06Q 20/102 |
| | | | | 705/40 |
| 7,509,281 B1 | * | 3/2009 | Brown | .................. H04M 15/06 |
| | | | | 705/37 |
| 9,785,913 B2 | * | 10/2017 | Dearing | .................... B07C 3/18 |
| 10,740,832 B2 | * | 8/2020 | Mehta | ................ G06Q 30/0641 |
| 10,949,796 B1 | * | 3/2021 | Tsou | .................... G06Q 10/087 |
| 11,010,706 B1 | * | 5/2021 | Wier | .................. G06Q 10/0837 |
| 11,868,945 B1 | * | 1/2024 | Woo | ...................... G06Q 10/083 |
| 11,941,089 B2 | * | 3/2024 | Baldwin | .............. G06K 7/1417 |
| 12,147,958 B2 | * | 11/2024 | Morgan | .............. G06Q 20/202 |
| 2001/0032183 A1 | * | 10/2001 | Landry | .................. G06Q 20/14 |
| | | | | 705/40 |

(Continued)

FOREIGN PATENT DOCUMENTS

CA          2760901 C   *   1/2021   ............. H04L 65/40

OTHER PUBLICATIONS

International Search Report issued in International Application No. PCT/US2024/021571 dated May 29, 2024 (11 pages).

*Primary Examiner* — Fateh M Obaid

(74) *Attorney, Agent, or Firm* — Bookoff McAndrews, PLLC

(57) ABSTRACT

Systems and methods are disclosed for a pre-note process in an online communication. The method includes receiving a request from an access device. The request is processed to determine a request type and a request content. The pre-note process is initiated for the request based on the request type and the request content, wherein a pre-note includes access device information, a reference identification, and/or item details for categorization. The one or more items associated with the request are categorized into one or more categories based on the pre-note. The request is executed based on one or more categories.

20 Claims, 14 Drawing Sheets

(56)     References Cited

U.S. PATENT DOCUMENTS

| | | | |
|---|---|---|---|
| 2002/0099649 A1* | 7/2002 | Lee | G06Q 20/4016 |
| | | | 705/38 |
| 2006/0242063 A1* | 10/2006 | Peterson | G07F 7/04 |
| | | | 705/45 |
| 2007/0150387 A1* | 6/2007 | Seubert | G06Q 10/10 |
| | | | 705/31 |
| 2010/0191594 A1 | 7/2010 | White et al. | |
| 2013/0297435 A1* | 11/2013 | Prellwitz | G06Q 20/20 |
| | | | 705/22 |
| 2014/0281918 A1* | 9/2014 | Wei | H04L 67/56 |
| | | | 715/234 |
| 2015/0066768 A1* | 3/2015 | Williamson | G06Q 20/405 |
| | | | 705/44 |
| 2016/0140487 A1* | 5/2016 | Tibbs | G06Q 10/0837 |
| | | | 705/330 |
| 2020/0097938 A1 | 3/2020 | Van Der et al. | |
| 2020/0184278 A1* | 6/2020 | Zadeh | G06N 3/044 |
| 2022/0391874 A1 | 12/2022 | Pezewski et al. | |
| 2023/0012460 A1* | 1/2023 | Hipp | G06Q 20/4016 |
| 2023/0128539 A1* | 4/2023 | Xu | G06Q 10/0838 |
| | | | 705/335 |
| 2023/0140792 A1* | 5/2023 | Jain | G06Q 20/34 |
| | | | 705/44 |

* cited by examiner

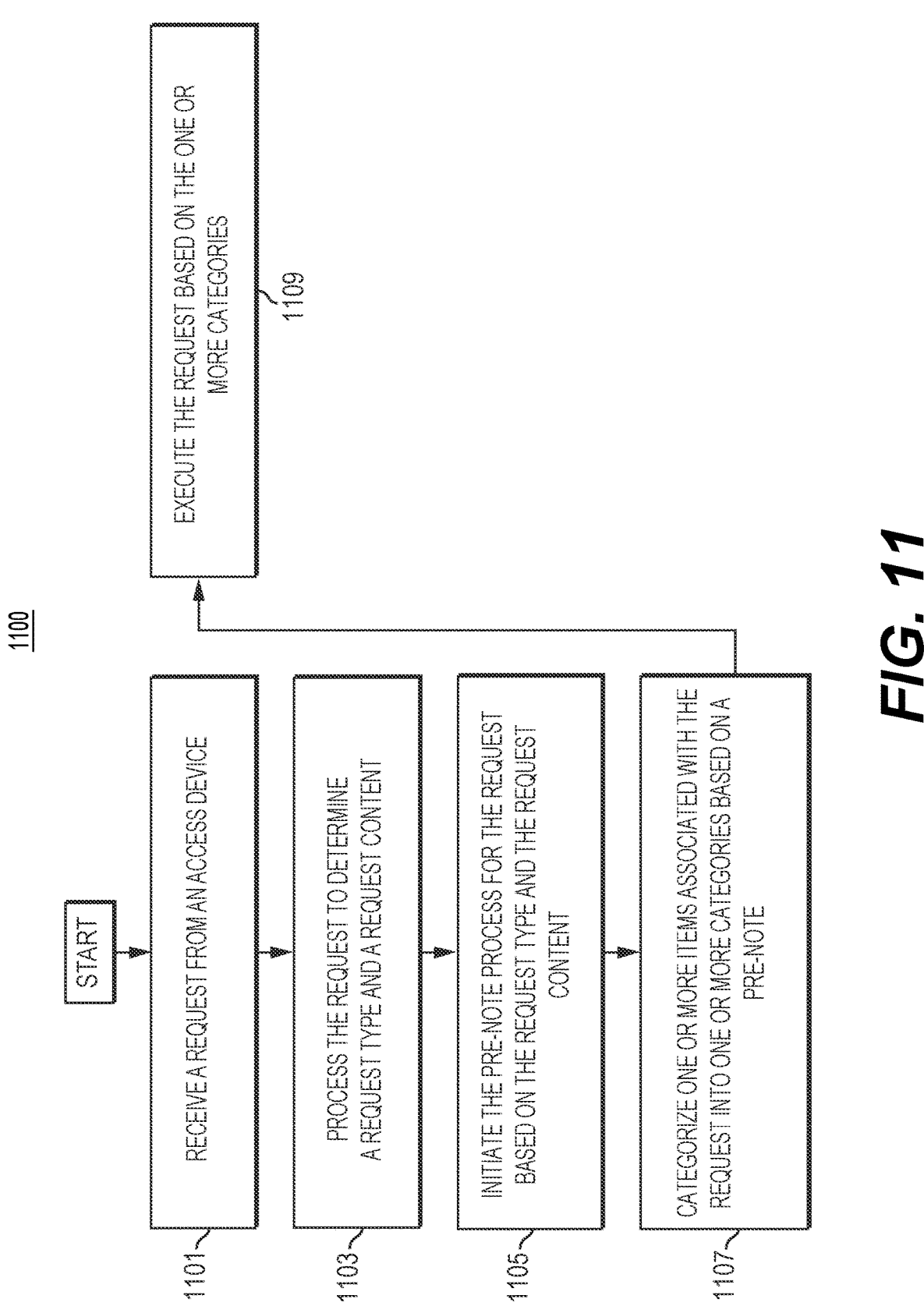

1100

START

1101 — RECEIVE A REQUEST FROM AN ACCESS DEVICE

1103 — PROCESS THE REQUEST TO DETERMINE A REQUEST TYPE AND A REQUEST CONTENT

1105 — INITIATE THE PRE-NOTE PROCESS FOR THE REQUEST BASED ON THE REQUEST TYPE AND THE REQUEST CONTENT

1107 — CATEGORIZE ONE OR MORE ITEMS ASSOCIATED WITH THE REQUEST INTO ONE OR MORE CATEGORIES BASED ON A PRE-NOTE

EXECUTE THE REQUEST BASED ON THE ONE OR MORE CATEGORIES

COMPUTER-IMPLEMENTED SYSTEMS AND METHODS FOR A PRE-NOTE-ENABLED FILTERED TRANSACTIONS PROCESS

CROSS-REFERENCE TO RELATED APPLICATION(S)

This patent application claims the benefit of priority to U.S. Provisional Application No. 63/493,172 filed on Mar. 30, 2023, the entirety of which is incorporated herein by reference.

TECHNICAL FIELD

The present disclosure relates generally to the field of data processing for electronic transactions and, more particularly, to systems and methods for a pre-note process for enabling a filtered spend program.

BACKGROUND

Various businesses and institutions offer discounts and prepaid benefits (or funds) to their beneficiaries, and seek ways to encourage spending on only certain products and services but not others. However, conventional technologies for filtering transactions can make it difficult to conveniently track, analyze, and/or categorize preapproved products associated with the prepaid benefits programs. Service providers are continually challenged in providing a filtered spend program, e.g., customizing approved product lists (APL) for products eligible for the program, with the added benefit that they provide businesses with focused reporting on purchases by the cardholders and the locations of the purchases to accurately evaluate the successful implementation of the programs.

Service providers are technically challenged in expanding the filtered spend program. For example, competition between acquirers creates an obstacle in attracting different types of merchants (e.g., pharmacies, medical practices. hardware specialty stores, bookstores, etc.) that do not utilize the same type of coding. The merchants utilizing or converting to a particular acquirer may also face the acquirer-imposed project backlogs before the filtered spend program is contemplated. In some scenarios, merchants are not able to participate in the filtered spend program because the acquirer they connect through or their service providers enriching the authorization does not participate in the filtered spend program. In addition, the merchant (e.g., third-party vendors) may require system alteration or upgrading to recognize or support the filtered spend program.

Service providers are also technically challenged in expanding the filter spend (FS) program beyond food and over-the-counter (OTC) items, for example, alternate retail segments (e.g. hardware, specialty), alternate product Identifiers (e.g. NDC, ISBN), online merchants, service-based merchants (e.g. rideshare, construction, medical coding), etc. There are also privacy concerns regarding the routing of data across the open network (e.g., privacy concerns with sending health-related data, protected health information (PHI)) over public networks per the Health Insurance Portability and Accountability Act of 1996 (HIPAA)). Furthermore, there is also a technical limitation on handling more items in a single transaction than supportable under current International Standard Organization (ISO) constraints (e.g., 50 unique items is the maximum payload). Accordingly, service providers are technically challenged to satisfy the needs of issuers to accept transactions over any network, using any type of access device, the demands of the merchants for a less intrusive authorization or settlement implementation, and the desire to consider alternative item adjudication providers.

Unless otherwise indicated herein, the materials described in this section are not prior art to the claims in this application and are not admitted to be prior art, or suggestions of the prior art, by inclusion in this section.

SUMMARY OF THE DISCLOSURE

The present disclosure solves this problem and/or other problems described above or elsewhere in the present disclosure and improves the state of conventional data processing methods by initiating a pre-note process in a filtered spend program.

In some embodiments, a computer-implemented method for a pre-note process in an online communication is disclosed. The computer-implemented method includes: receiving, by one or more processors, a request from an access device; processing, by the one or more processors, the request to determine a request type and a request content; initiating, by the one or more processors, the pre-note process for the request based on the request type and the request content, wherein a pre-note includes access device information, a reference identification, and/or item details for categorization; categorizing, by the one or more processors, one or more items associated with the request into one or more categories based on the pre-note; and executing, by the one or more processors, the request based on the one or more categories.

In some embodiments, a system for a pre-note process in an online communication is disclosed. The system includes: one or more processors; and at least one non-transitory computer readable medium storing instructions which, when executed by the one or more processors, cause the one or more processors to perform operations including: receiving a request from an access device; processing the request to determine a request type and a request content; initiating the pre-note process for the request based on the request type and the request content, wherein a pre-note includes access device information, a reference identification, and/or item details for categorization; categorizing one or more items associated with the request into one or more categories based on the pre-note; and executing the request based on the one or more categories.

In some embodiments, a non-transitory computer readable medium for a pre-note process in an online communication is disclosed. The non-transitory computer readable medium storing instructions which, when executed by one or more processors, cause the one or more processors to perform operations including: receiving a request from an access device; processing the request to determine a request type and a request content; initiating the pre-note process for the request based on the request type and the request content, wherein a pre-note includes access device information, a reference identification, and/or item details for categorization; categorizing one or more items associated with the request into one or more categories based on the pre-note; and executing the request based on the one or more categories.

It is to be understood that both the foregoing general description and the following detailed description are example and explanatory only and are not restrictive of the detailed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 11 is a flowchart for a pre-note process during an online transaction, according to aspects of the disclosure.

DETAILED DESCRIPTION OF EMBODIMENTS

Figure 1:
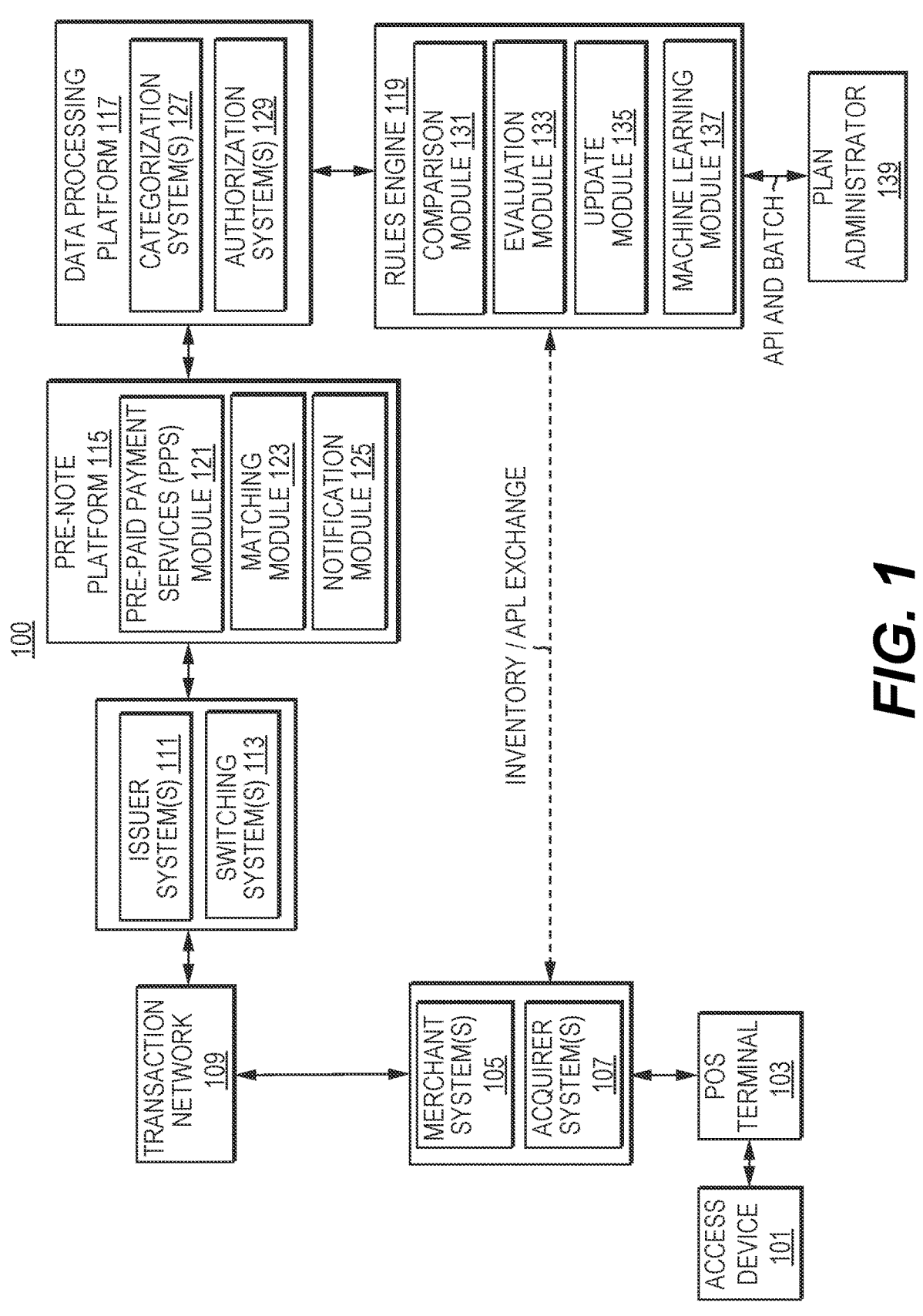
FIG. 1 illustrates a system for providing a pre-note process for an online transaction, according to aspects of the disclosure.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for identifying where, when, and what items card funds may be applied by the cardholder or their dependent. This includes categorizing, in real-time or near real-time, items associated with an authenticated transaction request and matching them to accessible rules-based purses based on where, when, and who is permitted.

As discussed, conventional prepaid benefit (or funds) payment systems lack the technical capability to accurately track, analyze, and/or allocate preapproved product items. To address these problems, systems and methods are disclosed that provide a filtered transaction process (e.g., a prepaid program or service) that may allow consumers (or participating members) to purchase filtered items (e.g., prepaid qualified items or products) from participating entities (e.g., a merchant, a bank, a company, a government agency, etc.) with pre-funded card (or account) balances. The filtered transaction process may utilize an Approved Product List (APL) to determine products that may be eligible for filtered spending (e.g., over-the-counter medications, healthy foods, etc.). In one embodiment, funds specific to the APL may be added to the prepaid card as a "purse" to enable cardholders to shop at participating retailers or merchants and purchase preapproved filtered items. Additionally, during a purchase transaction of a filtered item, the Stock Keeping Unit (SKU) of the filtered item may be assessed in real-time, determining whether each item may be eligible or ineligible according the APL. If an item is determined to be eligible, a corresponding transaction amount may be subtracted from (i.e., debited to) a purse associated with the categories identified in the APL. Items that may not be eligible may either be charged to a generic spending purse on that same card or may be declined. The filtered transaction process offers clients (e.g., employers, consumer brands, healthcare, or insurance companies) the means to encourage their beneficiaries to spend funds on specific items. The beneficiaries (or cardholders) may simply use their prepaid cards (e.g., filtered transaction cards) to purchase items (e.g., over-the-counter medications) as part of a corporate benefit, consumer brand incentive, and the like. Other use cases may include specific health food options, allowing the cardholders to receive discounts on specific purchases contributing to overall health, home repairs and supplies for a disaster relief program, any type of claim payments for insurance, or any other categories of items.

Systems and methods are disclosed for a pre-note process for the filtered spend program for: (i) making the filtered spend program network agnostic, (ii) increasing the item limit (e.g., to maximum in industry at 100 or more items), (iii) bypassing various friction points for merchant adoption (e.g., acquirers, switches, independent software vendors (ISVs), point-of-service (POS) vendors), (iv) moving current or possible privacy/HIPAA items out of the network path, (v) supporting merchants that cannot support split tender, and (vi) providing a path to participate for other merchant classes or item types.

In one embodiment, the pre-note process may assist the filtered spend program to expand the merchant network by: (i) removing competitive restrictions and friction on new merchant inclusion, (ii) providing the ability to support item detail for other product and merchant types, (iii) providing the option to support alternate networks, (iv) providing support for alternate adjudication or substantiation services, and/or (v) providing more options for merchant participation. The pre-note process may also assist the filtered spend program to expand the item definition for more item types, including alternate product identifiers (e.g., NDC, ISBN) and service-based merchants (e.g. rideshare, construction, medical coding). The pre-note process may also relieve HIPAA, competitive, and privacy concerns by using a separate non-financial private network to route to the adjudication engine. The adjudication engine may verify whether the transaction complies with the program rules and may route the transaction accordingly. In one instance, the pre-note process may support existing or new participating merchants under the baseline model. The items for the enhanced data that arrives in the baseline model or a new model are consistently adjudicated. While the baseline model is limited to 50 unique items, and the new model is not, the format of an item in the provided data is consistent.

FIG. 1 depicts an example architecture of one or more example embodiments of the present invention, including a system 100 that comprises access device 101, point-of-service (POS) terminal 103, merchant system(s) (hereinafter merchant 105), acquirer system(s) (hereinafter acquirer 107), transaction network(s) 109, issuer system(s) 111, switching system(s) 113 which connects to data processing platform 117 (i.e., a filtered transaction processing system) and rules engine 119. The pre-note platform 115 connects to the data processing platform 117, and the rules engine 119. The pre-note platform 117 may be reached initially by the POS terminal 103, the merchant 105, or the acquirer 107 directly to manage pre-note submissions, and indirectly from the data processing platform 117 and rules engine 119 when a financial transaction is to be matched by the matching module 123.

In one embodiment, the access device 101 may be a filtered transaction vehicle. The filtered transaction vehicle may be, for example, a credit card, a debit card, a gift card, a loyalty card, a bonus points card, a contactless payment device, a digital payment device, a digital wallet, etc. The filtered transaction vehicle may be used at any location, for example, brick-and-mortar stores, online e-commerce websites, e-commerce apps, etc., where the filtered transaction vehicle's sponsoring networks (e.g., New York Currency Exchange (NYCE)) or for non-filtered or pre-note transactions any network permitted for the transaction vehicle. (e.g. Visa®, MasterCard®, American Express, Discover®, other regional networks, etc.) may be accepted. In one embodiment, the access device 101 may include one or more user sub-accounts (e.g., purses, etc.) funded by a participating entity (e.g., a merchant, a bank, a company, a government agency, etc.). The access device 101 may be used at one or more merchant stores, online websites, or apps that may be associated with the filtered transaction vehicle issued by one or more participating entities (e.g., sponsoring or funding entities). In one embodiment, the filtered transaction vehicle may include functionality and aspects of both a filtered transaction vehicle and a non-filtered transaction vehicle (e.g., a standard credit or debit card). That is, a filtered transaction vehicle may be used anywhere the filtered transaction vehicle or a standard credit or debit card may be accepted. In another instance, a non-filtered transaction may be processed with all of the options described herein except the filtering of the items.

In one embodiment, the POS terminal 103 may be a traditional POS, an electronic cash register (ECR), or any mobile communication device (e.g., hand-held computers, desktop computers, laptop computers, wireless communication devices, cell phones, smartphones, mobile communications devices, a Personal Communication System (PCS) device, tablets, server computers, gateway computers, or any electronic device). The POS terminal 103 may collect transaction data (e.g., purchase transaction data) associated with the access device 101 (or equivalent data to identify the card holder) upon a user (e.g., a customer, recipient, a beneficiary, etc.) submitting the access device 101 at the POS terminal 103, and may transfer the transaction data associated with the access device 101 to the merchant 105, and eventually reach the pre-note platform 115, the data processing platform 117, and the rules engine 119. For example, the POS terminal 103, the merchant 105, and/or the acquirer 107 may be reached via an application programming interface (API) to log the pre-note, and the pre-note platform 115 may engage the data processing platform 117 to categorize one or more items, and the rules engine 119 to evaluate projected coverage. Financial transactions may arrive without enhanced data, and the pre-note platform 115 may match the incoming financial transactions to a pre-note and may apply the benefits.

In one embodiment, the POS terminal 103 may be a standalone filtered transaction terminal (e.g., a stand beside/standalone terminal) or other non-integrated POS terminals that may be configured to accept filtered transaction vehicles. The POS terminal 103 may communicate with the merchant 105 to execute electronic transactions (e.g., purchase transactions) associated with the access device 101. Additionally or alternatively, the POS terminal 103 may communicate directly with the pre-note platform 115, the data processing platform 117, and the rules engine 119 to execute the electronic transactions of this disclosure. The pre-note platform 115, the data processing platform 117, and the rules engine 119 may be intermediaries in this system to ensure validity of a transaction request associated with the access device 101.

In one embodiment, the merchant 105 may include a payment terminal (e.g., a "pin pad"), or, a data server, for example, hosting a merchant's e-commerce (or online) store. Additionally or alternatively, the merchant 105 may collect, via an online or offline interface, the transaction data associated with the access device 101 and transmit the transaction data to the acquirer 107. The acquirer 107 may communicate with the issuer system(s) 111 via the transaction network(s) 109 to execute one or more transactions based on the received transaction data.

In one embodiment, the acquirer 107 may include a standalone acquirer system and/or an integrated acquirer system that may be configured to receive transaction data from the merchant 105. The acquirer 107 may receive, from the POS terminal 103 and/or merchant 105, a transaction request associated with the access device 101. The transaction request may include, for example, a request to authorize a purchase/payment transaction. The acquirer 107 may then determine whether the access device 101 is a filtered transaction vehicle or a non-filtered transaction vehicle. The acquirer 107 may communicate to pre-note platform 115 generate a pre-note, and or for the financial transaction with the issuer system(s) 111 and the transaction network(s) 109 to complete the transaction request. In one instance, the POS terminal 103, the merchant 105, and/or the acquirer 107 may communicate directly to the pre-note platform 115. In one instance, the merchant 105 may utilize a third party within their sales flow (103-107) that may be the point of integration to the pre-note platform 115 to install the pre-note.

In one embodiment, the switching system(s) 113 may determine whether the transaction request includes enhanced data, lite-enhanced data, or non-enhanced data. In one embodiment, the enhanced data may include, for example, Stock Keeping Unit (SKU) level data (i.e., UPC for Universal Product Code, aka full cart data). The SKU is either an industry common identifier or a merchant's unique identifier for an item sold or provided by a merchant or a filtered transaction participating entity. In some embodiments, enhanced data may be required to facilitate the filtered transaction process of this disclosure. In one instance, if the financial transaction request includes any type of enhanced data the switching system(s) 113 may transmit the transaction request to the authorization system(s) 129 to complete the transaction request received from 113 to the issuer system(s) 111. In one instance, if the financial transaction request does not include enhanced data (e.g., SKU level data), the switching system(s) 113 may transmit the transaction request to the authorization system 129 which may engage pre-note platform 115 in an attempt to find a matching pre-note.

In one embodiment, the pre-note platform 115 is a platform with multiple interconnected components, servers, intelligent networking devices, computing devices, components, and corresponding software for initiating a pre-note process for the filtered spend program. In one embodiment, the pre-note platform 115 may include a process pre-paid payment services (PPS) module 121, matching module 123, and notification module 125. In one instance, a pre-note may be created by an API between the merchant 105 or POS terminal 103/ISO/ISV and the data processing platform 117. Then, the data processing platform 117 may invoke the categorization engine 231 and may return the analysis to the merchant 105. In another instance, the financial transactions may flow over any network. When non-enhanced financial transactions arrive at the processor, the processor may match the non-enhanced financial transaction to an existing pre-note. If matched, the category data stored with the pre-note may be linked to the financial transaction. In one instance, the financial transactions are not permitted to carry enhanced data, and no category data is provided in the response.

In one embodiment, the PPS module 121 may send a categorization request to the categorization system(s) 127 (e.g., categorization engine 231 of the categorization system(s) 127) outside of the authorization flow. The request may include references to the access device 101, contextual information associated with the user of the access device 101, and/or item details to be categorized. The request may indicate to initiate a new categorization, update/re-categorize a previously categorized pre-note, or remove/cancel the prior categorization for the referenced pre-note. In one instance, a pre-note for request type initiate is logged to the card account, a pre-note for request type update replaces the original pre-note (with history), or a pre-note for request type delete removes the original pre-note (with history). The PPS module 121 may initiate a categorization request to the categorization system(s) 127, and may log the response as a pre-note to the referenced access devices PAN. The PPS module 121 may identify a tracking number for the pre-note to be included in the API. The PPS module 121 may also perform error handling upon determining the pre-note for update/delete is not found (e.g. having been previously deleted, matched, or expired).

In one embodiment, the categorization system(s) 127 may be updated, per requirement, to: (i) support more than 50 items in the input payload, (ii) categorize them, (iii) mark-up the items by category under which they fall, and (iv) aggregate the total request by category in a summary block that can accommodate more than 12 categories. For example, the categorization system(s) 127 may increase the number of items that can be considered in a transaction to accommodate at least 100 unique SKU values items in the request. For example, the categorization system(s) 127 may update the ability to store categories related to a transaction from 12 to 25 categories in the database (e.g., APL database 229), and the pre-note platform 115 may store the response received with more than 12 categories. The categorization system(s) 127 may accept the categorization request via API as an alternative to the existing ISO message flow. The categorization system(s) 127 may annotate the item detail based on the category in which the item falls. The item may reflect the category identified by the APL and whether it is allowable (if found allowable). The categorization system(s) 127 may also calculate the category summary for all categories included in the response.

The categorization system(s) 127 may recognize the pre-note API, the request types (e.g., initial, update/re-categorize, or remove/cancel), and the tracking number. In one instance, for the request type initial, the categorization system(s) 127 may:

i. Complete the categorization of up to 100 items in up to 25 categories;

ii. The item detail may be updated to indicate the APL identified category of each item (which by implication is allowed if found on the APL and disallowed if not on the APL); and iii. Cart summary by category is added to indicate the category and sum of all items in that category.

In one instance, for the request type update/re-categorize, the categorization system(s) 127 may:

i. remove the prior categorization history held for reporting; and ii. Follow the request type Initial requirements steps.

In one instance, for the request type remove/cancel, the categorization system(s) 127 may:

i. remove the prior categorization history held for reporting.

In addition, the categorization system(s) 127 may return an error message for unknown APL, reference to the access device, or tracking number. For example, incoming APIs are received at the pre-note platform 115, whereupon the pre-note platform 115 may find a proxy and may identify the subset of the APL applicable to the specific access device 101. Generally, one or more items may be categorized against the whole APL, but if the access device 101 does not have sufficient funds to cover some categories, the pre-note platform 115 may apply the filter to provide a better merchant experience.

In one embodiment, the PPS module 121 may generate an API that may allow a caller (e.g., a third party) to pre-announce an authorization request that is intended to occur within a defined time period, with all enhanced data needed to identify benefits, an optional tracking/reference number, and a set of information that will enable account identification. In one instance, if a call type is initial, and the input did not include a caller supplied tracking number, then the PPS module 121 may generate one that is unique for the proxy account. In one instance, if a call type is update/re-categorize or remove/cancel, the PPS module 121 may confirm the tracking number exists. The PPS module 121 may recognize variable account identification details from the API and determine an internal standardized proxy. The PPS module 121 may prepare and initiate the internal API based on incoming and derived data (e.g. card available benefits or funding). The PPS module 121 may establish processes for obtaining, issuing, or licensing the API. The API may be initiated through the elected connectivity and routed to the PPS module 121. The API may send a response with sufficient data for the caller to recognize and interpret the response (i.e. fields containing an echo of key input data, the relevant reference to the access device, the tracking number, and the result of categorization.

The PPS module 121 may establish test user IDs and processes for user ID management. The PPS module 121 may remap selective fields of the incoming pre-note to normalize the pre-note requests and handling by the categorization system(s) 127. For example, the PPS module 121 may convert the accepted account identifiers to a standardized card proxy. The PPS module 121 may also validate input data fields and errors are raised, if required. For example, errors are returned for unknown cards, and accounts are not active without performing categorization.

In one embodiment, the matching module 123 is employed when the financial transaction arrives without enhanced data to match an incoming authorization to the pre-note and may apply the benefits. In one instance, the pre-note platform 115 may be updated to include a substantiation step for any transaction that does not include enhanced data in the ISO message. This step may search for an existing pre-note associated to the PAN of a card (e.g., access device 101), and when matched, the provided category data may be used in purse selection as if they had been sent by the merchant (e.g., merchant 105). In one instance, the matching module 123 may introduce a trigger (e.g., an edit check) that may invoke pre-note matching logic prior to any other exception logic in place for transactions on the filtered spend programs. The matching module 123 may seek a matching pre-note that may be on file. The matching module 123 may match the pre-note by various components, such as card/PAN, total transaction amount, tracking number, merchant identification (MID), merchant category code (MCC), address information for the first or second access device utilized in the transaction, and so on. The matching module 123 may link the matched pre-note to the authorization and treat the categories of the pre-note as if they had arrived in the ISO message for purse selection. This may include:

i. Log the pre-note values at the category requested amount (purse 0);

ii. Use the category allowed amount if provided, up to the transaction total requested amount to select purses using existing logic; and iii. Log the value applied to the purses as a category set applied to the actual purse.

In one instance, the matching process may apply to authorization and forced post transactions, for both debit and immediate credits, as well as enhanced settlements. The matching module 123 may match transactions accomplished with pre-note inclusive of multiple categories requiring one or more purses to be used for approved, partially approved, and declined transactions. The unmatched transactions may be processed as non-enhanced and may follow normal purse rules. The response to the authorization request which did not include enhanced data, whether matched to a pre-note or not, does not include enhanced data in the response.

In one embodiment, the matching module 123 may perform a process to expire unmatched pre-note. For example, based on the merchant type that initiated the pre-note, the matching authorization may vary (e.g., occur the same day or many days later). The brick and mortar retailers may typically authorize within minutes, while service partners, such as for pre-qualification of services, that do not perform the financial transaction may be separated in time by many days. Hence, to avoid an accumulation of pre-note that have been abandoned by the pre-note originator, the matching module 123 may disable old unmatched pre-notes. In one instance, the pre-notes are logged for the PAN with an inserted date and an expiration date. A default pre-note expiration duration may be established at 30 days. The matching module 123 may identify pre-notes that have hit their expiration date per schedule (e.g., daily, weekly, etc.), and then disable the expired pre-notes. The matching module 123 may provide a data feed to the reporting service to remove the data related to the set of expired pre-notes, identified by tracking ID, from reporting. The categorization system(s) 127 may remove data associated to an expired or removed pre-note as it may never be authorized, and such data may render data associated to item records misleading. For example, the categorization system(s) 127 may process a pre-note expiration data feed and remove that item from history (e.g., remove the referenced pre-note from the categorization history for the account). The pre-note and associated item detail is logged to either the categorization system(s) 127 or the notification module 125.

In one embodiment, the notification module 125 may confirm the PPS reports and extracts alerts and servicing feeds that reflect pre-note activities. For example, the authorized and settled transactions that matched to a pre-note are identified and contain the pre-note category data on the authorization and monetary data extracts, and the reports which reflect the filtered spend transactions. The pre-note itself may not be included in an alert, however financial alerts (e.g. for authorization) may include pre-note category data applicable to the transaction alerted as if it had been included in the authorization. In one instance, the notification module 125 may provide the plan administrator 139 notification of any new product identifiers observed on pre-notes or transactions of their member accounts, for their review and definition of future treatment. In another instance, the notification module 125 may generate an alert regarding one or more items in user interfaces of devices associated with the consumers. For example, the consumers, via their respective devices, may text a request for item-related information. The notification module 125 may generate a notification (e.g., a report) as a response to the request, and the notification may include detailed item-related information for both covered and not covered items.

In one embodiment, the pre-note platform 115 may identify a retail group that is blocked from the filtered spend program because of the capability of their acquirer or other switch or authorization providers. The pre-note platform 115 may also identify existing participating merchant constrained by item-level or category level limits. The pre-note platform 115 may engage merchants capable of effectively separating the processing of the items in the cart from the financial transaction by some time. The pre-note platform 115 may facilitate the selected merchant to use the pre-note API for initial categorization followed by a standard authorization over any card brand or transaction network 109 and merchant-supported method (e.g. Mag, chip, CNP, etc.) so that the transaction has been applied to separate purses based on item categorization. The pre-note platform 115 may also facilitate the merchant to revoke a prior pre-note (e.g., when the initial pre-note indicated that the card may not support any of the included items) and never submit a standard authorization. The pre-note platform 115 may also facilitate the merchant to replace or update a prior pre-note (e.g., the initial pre-note indicated items are not covered and the cardholder cannot pay for them, so remove the items from the cart requiring re-categorization) followed by a standard authorization for the updated amount.

In one embodiment, the pre-note platform 115 may select a service provider that performs initial engagement or gathers the items for a planned purchase. For example, the agreement with the service provider that performs a service (e.g. pharmacy benefit managers (PBM) to evaluate and price a prescription) may provide the pre-note working with a known merchant (e.g., a merchant that fills and sells that prescription). The card may not be a part of the third-party service, hence an alternative identification system may be utilized to determine the card proxy for the pre-note. In another embodiment, the pre-note platform 115 may select a service provider that may be a small to midsize merchant, an online merchant using a payment service, or an ISO participating merchant that works with a delivery service/payment facilitator that is not capable of enhanced data use.

In one instance, after the initial categorization, the data history may include allowed items, however, those items may not be covered by the card. Therefore, at the point that funds are approved from the account, the categorization system(s) 127 may update the categorization history for the tracking number to indicate the covered or approved value to improve the reporting to the provider. A similar limitation is placed on the ISO-based messages and similar updates may be applied (possibly based on Retrieval Reference Number (RRN)). The pre-note platform 115 improves the pre-note categorization result to be an exact or close prediction of the subsequent authorization.

In one embodiment, the pre-note platform 115 may provide a mapping of individual merchant IDs to participating banners and retail groups to enhance prepaid data solutions (PDS), data extract, and item detail reporting. In another embodiment, the pre-note platform 115 may use the data processing platform 117's retailer definition capability to define a filtered spend participating hierarchy with each retail group identified and further broken down by their recognized banners used for reporting and the MIDs that apply to each banner. The pre-note platform 115 may provide the ability to retrieve the item detail for a given transaction (by RRN or tracking) from the detail reporting service via a client facing API and/or Customer Service Application (CSA). The pre-note platform 115 may move the reporting of item utilization to a centralized server so that data that may come from sources other than the categorization engine can be consolidated. The existing item based reports are re-homed to the new reporting service and may include the additional sourced details. This may replace the existing item reports and add new reports which combine item data into a common report. In one instance, the pre-note platform 115 via a machine learning process, may train a machine learning model to perform the pre-note process discussed herein.

In one embodiment, the rules engine 119 is a platform with multiple interconnected components. The rules engine 119 includes one or more servers, intelligent networking devices, computing devices, components, and corresponding software for authenticating, overriding, and/or updating data associated with a transaction request (e.g., filtered spend transaction request). In one embodiment, the rules engine 119 may include a comparison module 131, an evaluation module 133, an update module 135, and a machine learning module 137.

There has been an escalation in the occurrences of false matches due to an increase in the use of alphanumeric merchant identification (MID) numbers, and present technologies are limited in their capability to efficiently and accurately detect false matches. In one embodiment, the comparison module 131 may perform name matching during authorization settlement by providing the ability to include alphanumeric MIDs in the merchant lists in a manner to not invalidate the current lists by: (i) changing the authorization lookup to use the actual MID to determine a match, (ii) normalizing the MID upon determining there is no match and retry the lookup using the normalized value, or (iii) run a script to look for recent transactions approved based on the normalized MID, collect the original MID value, and perform a comparison. In a similar manner, the comparison module 131 may provide alphanumeric MIDs in the merchant lists during matching of the pre-note to the financial transaction. In one embodiment, the comparison module 131 may expand the current purse qualification logic to include merchant name matching logic (e.g., MCC and MID) and the ability to configure restricted authorization network (RAN) lists via the automated client configuration (ACC). For example, the comparison module 131 may change the merchant name matching logic to utilize the RAN list in qualifying a purse based on the MID and merchant name. The authorization lookup is changed to use the RAN logic first, and if not matched, normalize the MID and retry the lookup using the normalized value. In one embodiment, the comparison module 131 may generate a report that identifies configured items (e.g. MCC group, network, or RAN list) under the client tree to show the items in the report that are needed to appropriately manage the programs. In one instance, an authorization system(s) 129 may consider the RAN approach to the merchant terminal IDs, inclusion/exclusion networks, exception lists, and substantiation rules. The comparison module 131 via the machine learning module 137, may train a machine learning model to perform the name matching during authorization settlement.

In one instance, access device 101 may be an open-loop transaction vehicle that is accepted wherever their network brand (e.g. Visa®, MasterCard®, Discover®) is honored and/or a closed-loop transaction vehicle that is accepted only by the issuing merchant system. RAN bridges the gap between open and closed-loop transaction vehicles by building a restricted participating network of merchants where a transaction vehicle is used without any change on the acquiring side. In one instance, RAN allows customization of usage of the access device 101 to create unique cardholder offerings. With RAN, pinpoint targeting of payment card usage delivers control, flexibility, and accuracy. For example, RAN technology may create a sub-network on the open network (e.g., a network operated by Visa®, MasterCard®, Discover® operators), and may direct spending of open-loop transaction vehicle to only a select merchant or group of merchants. In many instances, RAN solutions are used to drive specific cardholder/consumer behaviors, such as an incentive program.

The existing systems and services also experience technical difficulties in allowing select users to access funds after the expiration of purses that hold cash or virtual value for benefit programs. In one embodiment, the evaluation module 133 may override the expiration date of a purse associated with the access device 101 with a new expiration date (e.g., pre-determined additional days based on contextual information of the user). The evaluation module 133 may utilize an API to set an alternate purse expiration date for a specific PAN and purse. Alternatively, the evaluation module 133 may remove the override and restore the default. For example, if users purchase items at the end of a benefit period and experience issues that require them to return or exchange the items, the credit applies to the original purse which may be expired. Re-opening expired purses for every user is impractical, moving the credit to an alternative purse may not match the required purse use rules, or moving the credit to the next period purse may violate certain regulatory limits by giving a full period of use. Therefore, the evaluation module 133 overrides the expiration date of a purse to extend the useful period of funds for an additional number of days, and give the users extra days to access those funds. In one instance, overriding the expiration date is based, at least in part, on historical user data (e.g., payment history, payment defaults, fraudulent activities, etc.), credit rating (e.g., credit history), user profile data (e.g., employment, salary, debt-to-income ratio, etc.), amount of the transaction, and so on. In one embodiment, the evaluation module 133 via the machine learning module 137, may train a machine learning model to override the expiration date of a purse. The evaluation module 133 via the machine learning module 137, may train a machine learning model to perform PAN/CAN level override for effective usage of the available funds or to prevent misuse of the funds.

In one embodiment, the update module 135 may update existing purse based ACC nodes to apply RAN lists in place of MCC group (e.g., a set of MCCs) and networks. For example, MCC group may identify allowed sets of MCCs for a purse and MCC specific cash usage limits, the update module 135 may update MCC group with alternate RAN MCC group to define the MCC allowed on the purse (e.g., for each occurrence of an MCC group element, offer a RAN MCC group element set of up to 10 lists which may be inclusive or exclusionary in nature). For example, network name may identify a list of remap merchants, the update module 135 may update network name with alternate RAN network name to define possible merchants allowed on the purse (e.g., for each occurrence of a network name element, offer a RAN network name element set of up to 10 lists which may be inclusive or exclusionary in nature). For example, exclude merchant network may identify up to 10 lists of MIDs to disqualify a transaction, such exclude merchant network may not be necessary, as RAN MCC group may be an exclusion type. For example, merchant terminal identifier (MTID) network purse may identify up to 10 lists of MIDs to disallow or override to allow, and such MTID network purse may be compatible with RAN technology. In such manner, the update module 135 allows an alternate method to define and maintain MCC groups and network names for purse qualification, thereby enabling accurate configuration of the program to support refined authorization and settlement rules. In one embodiment, the update module 135 via the machine learning module 137, may train a machine learning model to update existing purse.

Figure 12:
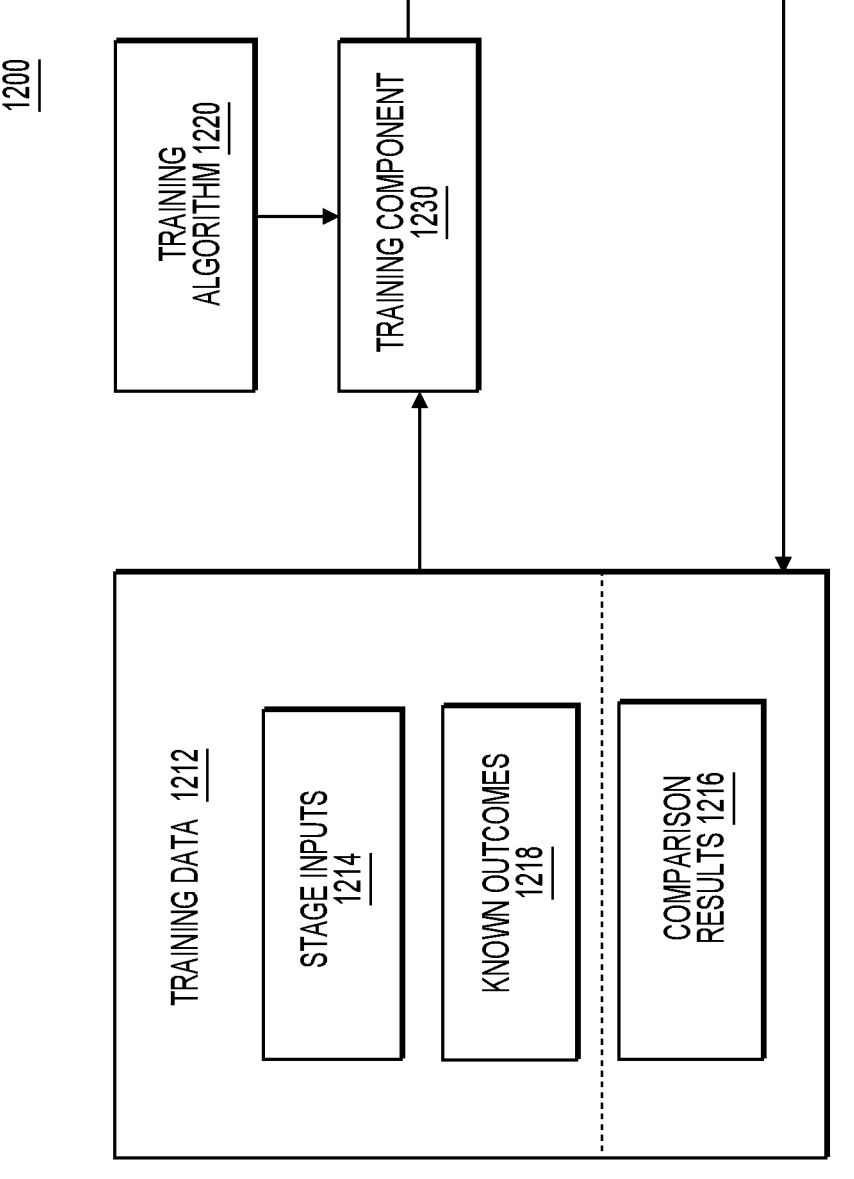
FIG. 12 shows an example machine learning training flow chart.

In one embodiment, the machine learning module 137 performs model training using training data (e.g., from FIG. 12 training data 1212 illustrated in the training flow chart 1200) that contains input and correct output, to allow the model to learn over time. The training is performed based on the deviation of a processed result from a documented result when the inputs are fed into the machine learning model, e.g., an algorithm measures its accuracy through the loss function, adjusting until the error has been sufficiently minimized. In one embodiment, the machine learning module 137 randomizes the ordering of the training data, visualizes the training data to identify relevant relationships between different variables, identifies any data imbalances, and splits the training data into two parts where one part is for training a model and the other part is for validating the trained model, de-duplicating, normalizing, correcting errors in the training data, and so on. The machine learning module 137 implements various machine learning techniques, e.g., k-nearest neighbors, cox proportional hazards model, decision tree learning, association rule learning, neural network (e.g., recurrent neural networks, graph convolutional neural networks, deep neural networks), inductive programming logic, support vector machines, Bayesian models, etc. In one embodiment, the machine learning module 137 may run complex data analysis, rules, and/or predictive modeling on historic data to learn data routing, user authentication, and/or transaction authorization. For example, the machine learning module 137 may identify, in real-time or near real-time, any irregularities in regular transactions and user authentication.

In one embodiment, the rules engine 119 may transmit authenticated and updated data to the data processing platform 117. In one embodiment, the data processing platform 117 is a platform with multiple interconnected components, one or more servers, intelligent networking devices, computing devices, components, and corresponding software for filtered transactions that allow participating members to purchase filtered items from participating entities. In one embodiment, the data processing platform 117 may include categorization system(s) 127 and authorization system(s) 129. In one instance, a plan administrator 139 may assist system 100 and process 200 in managing APL item contents, and reporting of the purchased items.

In one embodiment, the categorization system(s) 127 may analyze and/or categorize the transaction data associated with the received transaction request (whether pre-note or financial). The categorization system(s) 127 may include an APL database 229 and a categorization engine 231, which are discussed below in FIG. 2. The acquirer 107 may connect to the issuer system(s) 111 after switching system(s) 113, which in turn transmits the transaction request to the categorization system(s) 127 and/or the authorization system(s) 129. The categorization system(s) 127 may via the switching system(s) 113 transmit the analyzed and/or categorized transaction data to the authorization system(s) 129. The authorization system(s) 129 then communicates the response of the issuer system(s) 111 via the transaction network(s) 109 to complete the transaction request, discussed in detail below.

Figure 13:
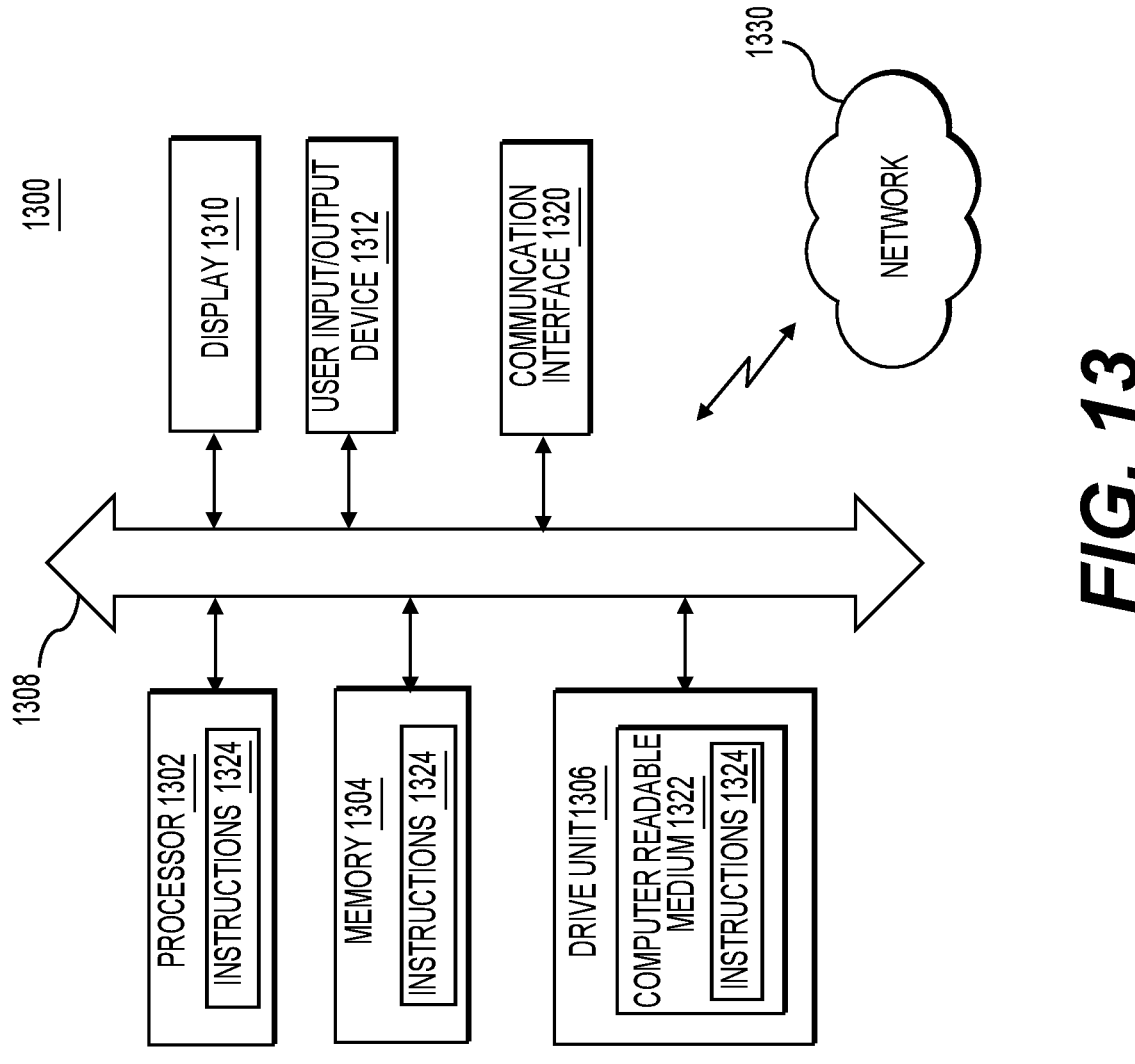
FIG. 13 illustrates an implementation of a computer system that executes techniques presented herein.

As used herein, terms such as "module" or "component" generally encompass hardware and/or software, e.g., that a processor or the like used to implement associated functionality. The above presented modules and components of the pre-note platform 115, data processing platform 117, and rules engine 119 are implemented in hardware, firmware, software, or a combination thereof. Though depicted as a separate entity in FIG. 1, it is contemplated that the pre-note platform 115, data processing platform 117, and rules engine 119 are also implemented for direct operation by computer system 1300 (FIG. 13). As such, the pre-note platform 115, data processing platform 117, and rules engine 119 generates direct signal inputs by way of the operating system of the computer system 1300. The various executions presented herein contemplate any and all arrangements and models.

Figure 2:
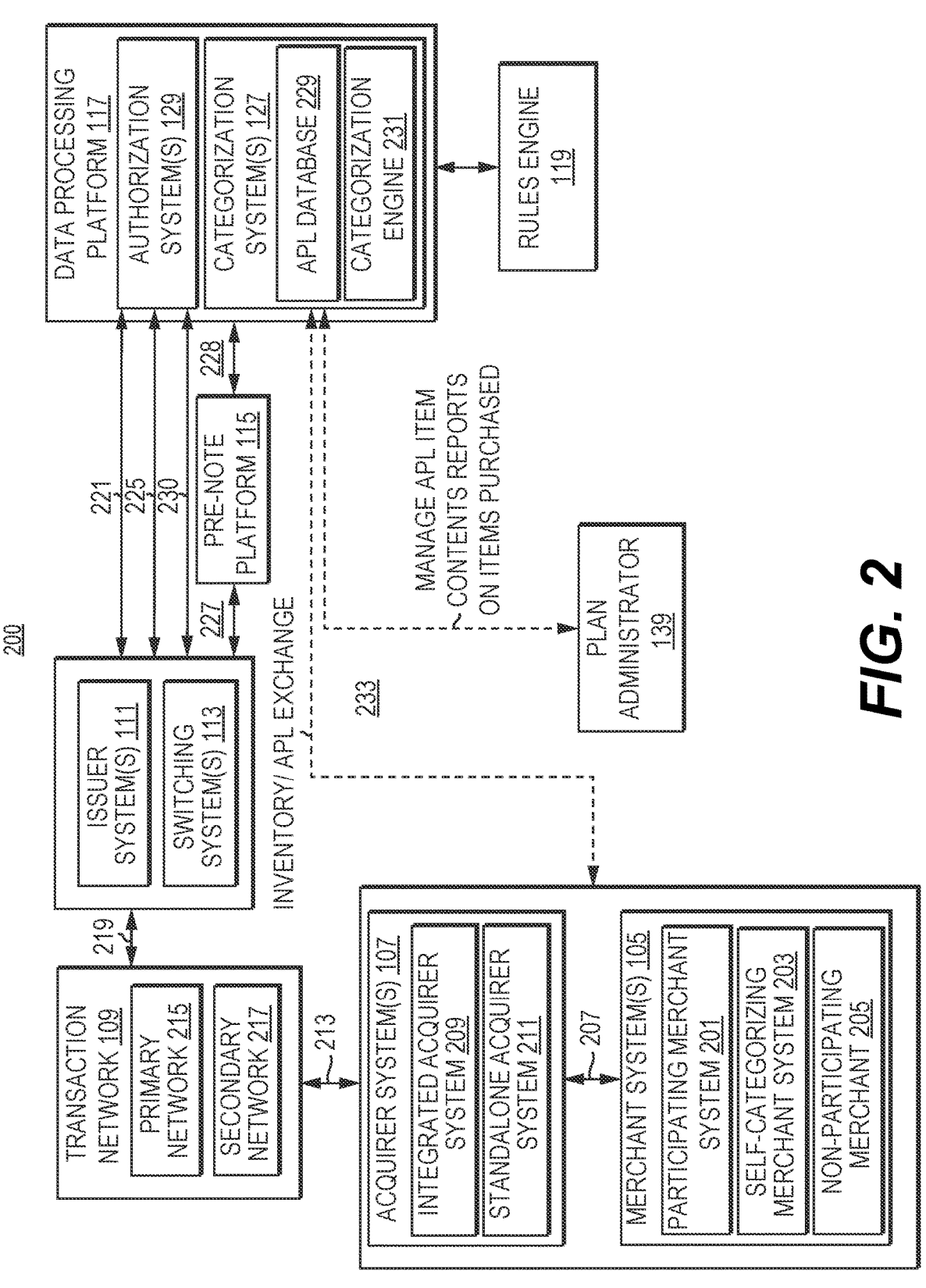
FIG. 2 illustrates a filtered transaction process, according to aspects of the disclosure.

FIG. 2 illustrates a filtered transaction process 200, according to aspects of the disclosure. In particular, FIG. 2 depicts a more detailed example illustration of the system 100, but should not be construed as limiting the system 100. In one embodiment, the merchant 105 may include a participating merchant system 201, a self-categorizing merchant system (hereinafter self-categorizing merchants 203), and/or a non-participating merchant system (hereinafter non-participating merchants 205). In step 207, the participating merchant system 201 may utilize a standalone filtered transaction terminal (e.g., a standalone terminal) or other integrated POS terminals that may be configured to accept the filtered transaction vehicles of this disclosure. For example, the participating merchant system 201 may utilize an integrated acquirer system 209 or a standalone acquirer system 211 of the acquirer 107 to convey enhanced data for filtered spend using the primary network 215 to reach the issuer system(s) 111. At the issuer system(s) 111, the switching system(s) 113 may connect with the data processing platform 117, which, using data from the pre-note platform 115 and the rules engine 119, may facilitate one or more electronic transactions (e.g., a purchase transaction) of this disclosure. In one instance, the non-participating merchant 205 may typically use POS terminal 103.

In step 213, the acquirer 107 may determine whether to transmit the transaction request via a primary network 215 or a secondary network 217. For example, if the transaction data includes enhanced data (e.g., SKU level data), the acquirer 107 may transmit the transaction request to the primary network 215 (e.g., NYCE network). At step 219, the primary network 215 may then transmit the transaction request with the enhanced data to the switching system(s) 113. If the transaction data does not include any enhanced data, the acquirer 107 may transmit the transaction request via either the primary network 215 or the secondary network 217 (e.g., Visa®, MasterCard®, Discover®, other regional networks, etc.). At step 221, the secondary network 217 may transmit the transaction request without enhanced data, via the issuer system(s) 111, to the authorization system(s) 129 to complete the transaction request without routing the transaction request to the switching system(s) 113.

In another embodiment, the self-categorizing merchants 203 may communicate with the acquirer 107 to facilitate one or more electronic transactions (e.g., purchase transactions) in accordance with this disclosure. In one embodiment, the self-categorizing merchants 203 may request to participate in one or more aspects of the filtered transaction process of this disclosure. However, the self-categorizing merchants 203 may not be configured to transmit the required enhanced data (e.g., SKU level data) through the acquirer 107. In this embodiment, the self-categorizing merchants 203 may transmit self-categorized data (or lite-enhanced data), along with the transaction request, to the acquirer 107. The self-categorized data may be data categorized by the self-categorizing merchants 203 that corresponds to one more items carried or provided by the self-categorizing merchants 203. The self-categorized data may include one or more filtered items that may correspond with categorization data stored in the categorization system(s) 127. In step 213, the acquirer 107 may transmit the transaction request including the self-categorized data to the primary network 215 or the secondary network 217. The primary network 215 or the secondary network 217 may then transmit the transaction request including the self-categorized data to the switching system(s) 113 (step 219) or via the issuer system(s) 111 to the authorization system(s) 129 (step 221), and then complete the transaction request with the issuer system(s) 111. In another instance, the switching system(s) 113 or the issuer system(s) 111 may transmit the transaction request including the self-categorized data to the pre-note platform 115. The pre-note platform 115 may search and match the transaction request including the self-categorized data to a pre-note and apply the benefits per the methods described herein.

In one embodiment, the switching system(s) 113 may determine whether the transaction request received from the primary network 215 includes enhanced data, lite-enhanced data, or non-enhanced data. At step 225, the switching system(s) 113 may determine the transaction request includes lite-enhanced data or non-enhanced data, and may transmit the transaction request to the data processing platform 117 (e.g., authorization system(s) 129) to complete the transaction request with the issuer system(s) 111. At step 228, the data processing platform 117 may call the pre-note platform 115 to match the transaction request with non-enhanced data to a pre-note. The pre-note platform 115 may initiate the pre-note process per the methods disclosed herein. The pre-note platform 115 may transmit the transaction request with a pre-note to the data processing platform 117 (e.g., categorization system(s) 127). In another instance, the switching system(s) 113 may determine the transaction request includes enhanced data (e.g., SKU level data), and may transmit the transaction request with the enhanced data to the authorization system(s) 129 to complete the transaction request with the issuer system(s) 111.

In one embodiment, the categorization system(s) 127 may include the APL database 229 and the categorization engine 231. The APL database 229 may store one or more APL lists associated with the access device 101 (e.g., a filtered transaction card) and/or one or more filtered transaction participating entities (e.g., a bank, a company, a government agency, etc.). The APL database may have obtained participating merchant system 201, or self-categorizing merchants 203 product inventory to enable categorization of the received enhanced data. The categorization system(s) 127 may manage the contents of the APL lists stored in the APL database 229. The APL lists may include, for example, approved Universal Product Codes (UPC), Price Look-Up (PLU) codes, comparable product identifiers (e.g., maker codes), and/or cross references to categories of products identified by the system 100 to be applied by the categorization system(s) 127 either when invoked from 115 or 111/113.

A participating merchant, or any filtered transaction participating entities, may add filtered items to, or remove filtered items from an APL list based on changes to inventory items via one or more interfaces. A single item may be associated with a single category or multiple categories on a given APL list. Additionally, a card bank identification number (BIN) of a filtered transaction vehicle (e.g., the access device 101) may be associated with one or more specific APL lists. The categorization system(s) 127 may provide one or more APL lists to the merchants who may request to self-categorize and/or organize the categorization data. The categorization system(s) 127 may be configured to provide one or more APIs which may be utilized by one or more merchants, plan providers, or entities that may participate in the filtered transaction process of this disclosure. The one or more APIs may be configured to respond to a user inquiry (e.g., item identification by scanning a UPC code by a client, a client app utilizing the API to lookup whether an item is covered by the filtered transaction process, etc.). In one embodiment, one or more APIs may enable the display of graphics primitives such as icons, bar graphs, menus, buttons, data entry fields, etc. The one or more APIs may cause interfacing of guidance information to include, at least in part, one or more annotations, audio messages, video messages, or a combination thereof.

At step 228, the categorization engine 231 may receive the transaction request with pre-note from the pre-note platform 115 and may categorize one or more items identified in the transaction request. The categorization engine 231 may identify category and subcategory values associated with one or more items identified in a transaction request by checking against the appropriate APL file associated with the specific filtered access device 101 of the transaction request. An APL file may have caused the items to be aggregated in multiple benefit categories, because the filtered transaction vehicle (e.g., access device 101) may have one or more benefits available, the most correct placement of those items may be determined (by the authorization system(s) 129) during pre-note insertion using the aggregated categories determined by the categorization system(s) 127.

In one embodiment, the categorization engine 231 may utilize identification data (e.g., a BIN value, or card identifier) of a filtered transaction vehicle to associate the correct APL files for the transaction where the APL is a list of one to many items (e.g., UPC/PLU items) against which the items identified in a transaction request may be evaluated. The categorization engine 231 may then determine a category or a subcategory for each UPC/PLU item identified in the transaction request. The categorization engine 231 may then create a summary of total amounts allocated among one or more categories identified and provide that information for use by the authorization system(s) 129 in identification of the benefit purse types (e.g., Healthy Food Choice (HFC) purse, OTC purse, and/or OTH purse) that can cover that portion of the transaction. In one embodiment, the categorization engine 231 may categorize and summarize the items that are not identified in the APL list as a generic category representing other items not permitted by the APL and for this example covered only by a purse capable of non-APL items (e.g. an OTH purse). Additionally, for any errors associated with the categorization process of this disclosure, all of the identified amounts may be categorized in a generic category representing other items not permitted by the APL since categorization may not have occurred.

Completing step 228, the categorization system(s) 127 may transmit a result of the categorization to the merchant 105 and/or acquirer 107. Subsequently, the merchant 105 may initiate a purchase transaction (e.g., through the merchant 105, the acquirer 107, the transaction network 109, issuer system(s) 111, switching system(s) 113, and so on) which may in turn, by initiating step 225, may provide this categorization information to the authorization system(s) 129. That is, the categorization system(s) 127 may generate a categorization response based on the one or more items of the transaction request that are categorized by the categorization engine 231 and the authorization system(s) 129 may determine which benefit amount can be applied, if any (e.g., pre-authorization by the authorization system(s) 129). For example, an individual benefit is described by one to many public and internal mapped categories which, using data provided in rules engine 119, correspond to a HFC purse, OTC purse, and/or other (OTH) purse. Of course, any other suitable purses may be identified and established based on the products and items associated with merchants or entities that may participate in the filtered transaction or fall outside the merchant set (MCCs) for which filtering is then available or required. The one or more benefit purses may include pre-funded or fund on demand balances provided by a sponsoring entity of the filtered transaction of this disclosure. The authorization system(s) 129 may use the data provided by the categorization engine 231 and the purse definition and rules data to determine the most suitable purse set for the transaction (e.g., a pre-note is evaluated to hold funds pending an authorization for a financial transaction). As such, one or more purses associated with a filtered transaction vehicle, if funded, may be utilized to purchase various items that may be eligible or ineligible for the filtered transaction in accordance with this disclosure.

At step 230, the authorization system(s) 129 may communicate with the issuer system(s) 111 to complete the transaction request initially transmitted from the merchant 105. For example, based on the categorization of the items identified in the transaction request, prepaid balances associated with the filtered transaction vehicle may be deducted or updated accordingly. The filtered transaction process of this disclosure may offer participants such as employers, consumer brands, healthcare, or insurance companies the means to encourage spending for specific purchases. That is, a beneficiary (e.g., cardholders may utilize the filtered transaction vehicle (e.g., prepaid card) to purchase items, such as, for example, over the counter medications (e.g., cough syrup, aspirin, bandages, etc.) as part of a corporate benefit or consumer brand incentive. Other use cases may include specific health food options, allowing cardholders to receive discounts on specific purchases contributing to overall health. Further, at step 233, the categorization system(s)

127 may allow the participating entities to categorize filtered items into categories, update categories in APL files, track individual product items identified in transaction requests, and perform reporting and analysis of the filtered items listed in the APL files and associated transaction requests. In one embodiment, the SKU level data in the enhanced data of a transaction request may be utilized to identify and update the filtered items in the APL files.

Figure 3:
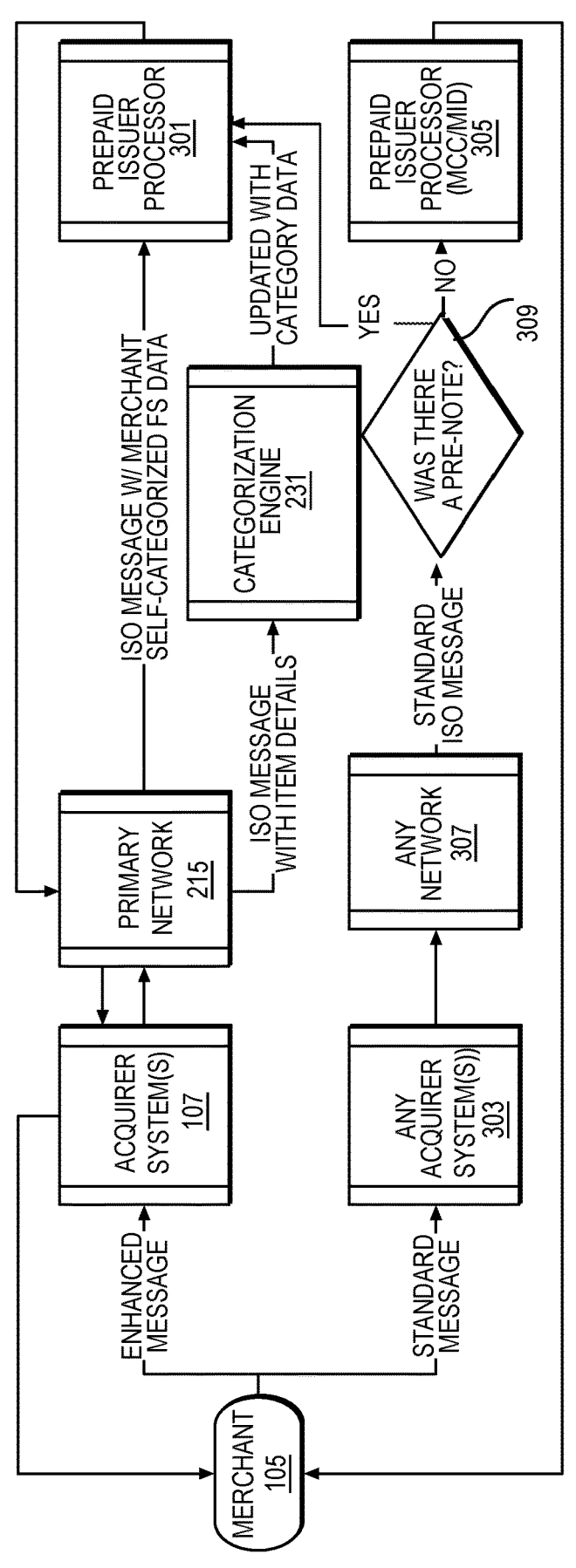
FIG. 3 is a flow diagram that illustrates an automated routing of requests based on message type and message content, according to aspects of the disclosure.

FIG. 3 is a flow diagram that illustrates the automated routing of one or more request(s) based on message type and message content, according to aspects of the disclosure. In one example embodiment, the merchant 105 (e.g., a participating full basket merchant) may send an enhanced ISO message containing up to 50 distinct UPC codes with the quantity and net price to acquirer 107. Similarly, merchant 105 (e.g., a participating self-categorized merchant) may also send an enhanced ISO message indicating the sub-total value of the transaction that fits each of the public categories (e.g., OTC items, food, etc.) to the acquirer 107. The acquirer 107 may route the ISO message to the primary network 215 (e.g., NYCE). Depending on the content, the primary network 215 may route the ISO message either directly to a pre-paid issuer processor 301 (e.g., issuer system(s) 111), or through the categorization engine 231 for substantiation and then to the pre-paid issuer processor 301.

In one instance, an ISO message with merchant self-categorized filtered spend data may be routed directly to the pre-paid issuer processor 301. In another instance, an ISO message with item details may be passed through the categorization engine 231. The categorization engine 231 may update the ISO message with category data and then forwards the updated message to the pre-paid issuer processor 301. The pre-paid issuer processor 301 may determine the availability of funds to cover the cost of the categorized items and may respond to the primary network 215, with an approval, a partial approval, or a decline response indicating the subtotal of the transaction that was covered by the public category. The primary network 215 may forward the response of the pre-paid issuer processor 301 to the merchant 105, whereupon the merchant 105 may opt to use returned data on receipt, with public categories OTC, food, and other reportable classes. In one instance, the merchant 105 may use the response to guide the consumers on coverage of one or more items. For example, items that are allowed and covered are approved; items that are allowed but not covered by the benefits may not be approved; items that are allowed but partially exceed the coverage may be partially approved; and items that are allowed by the benefits which have been exhausted may not be approved.

In another instance, the merchant 105 (e.g., a non-participating merchant) may send a standard ISO message to any acquirer system(s) (hereinafter any acquirers 303). Any acquirers 303 may transmit the standard ISO message to any network 307, whereupon the standard ISO message is processed for pre-notes (step 309). For example, the pre-note platform may determine the standard ISO message includes a pre-note, and may match the pre-note to apply appropriate benefit set. For example, the pre-note platform may determine the standard ISO message does not include a pre-note, whereupon the standard ISO message may be transmitted to pre-paid issuer processor 305 or reversed without being used. The pre-paid issuer processor 305 may determine the availability of funds and may respond to the merchant 105 with an approval, a partial approval, or a decline response. Current solutions only indicate whether an item is on the APL or not on the APL, and are technologically challenged to indicate whether a payment vehicle can cover the benefits.

It is advantageous if a system indicates: (i) allowed vs. denied and (ii) funded vs. not funded to the consumers. Such non-participating merchants are invited to participate in the filtered spend program.

Figure 4:
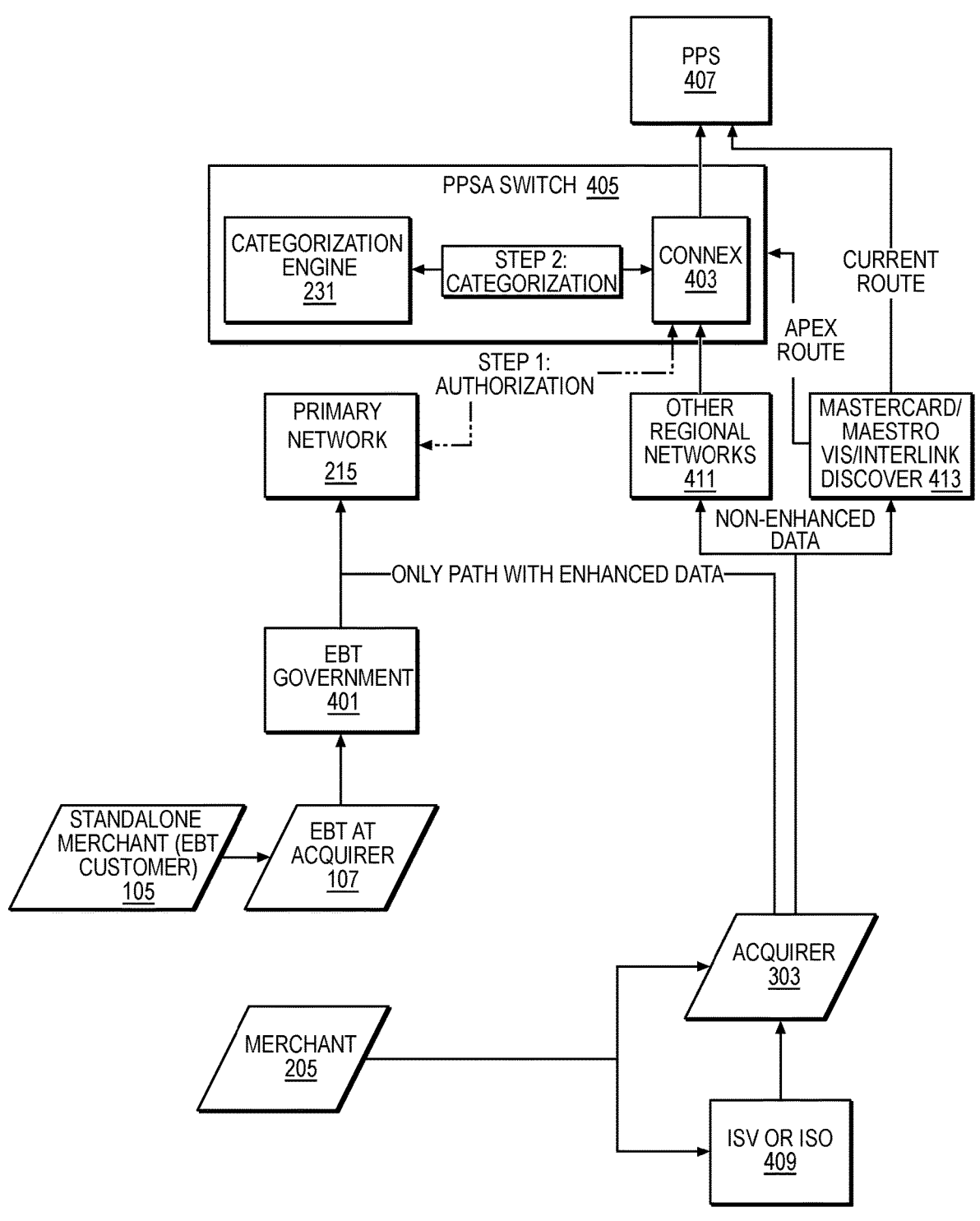
FIG. 4 is a flow diagram that illustrates routing channels for a participating merchant with enhanced data and a non-participating merchant with non-enhanced data, according to aspects of the disclosure.

FIG. 4 is a flow diagram that illustrates routing channels for a participating merchant with enhanced data and a non-participating merchant with non-enhanced data, according to aspects of the disclosure. In this example embodiment, a merchant 105 (e.g., a participating merchant, an electronic benefits transfer (EBT) customer) may send a request with enhanced data to acquirer 107 (e.g., EBT at acquirer 107). The acquirer 107 may process the request with enhanced data and then transmit the enhanced data to EBT government 401 (e.g., system that allows benefit recipients to request transfer of government benefits from a Federal account to a retailer account to pay for products purchased). The EBT government 401 may then route the data to the primary network 215 (e.g., NYCE). The primary network 215 passes through the switching system (e.g., Connex 403, PPSA fronting the Prepaid platform (PPS) switch (hereinafter "PPSA switch 405")) wherein the merchant 105 and the request with enhanced data are authenticated. In one instance, the switching system may utilize the absence or presence of a cart or category data in the transaction to determine whether to engage with the categorization engine 231 before routing the request with enhanced data to the issuer processor PPS 407 (e.g., PPS module 121 of the pre-note platform 115). The categorization engine 231, if invoked, analyzes and categorizes the data (e.g., card data), and transmits the augmented transaction to the issuer processor PPS 407. The issuer processor PPS 407 determines the applicable purses based on category data delivered then transmits a response to merchant 105 regarding the adjudication of the enhanced data through the PPSA switch 405, the primary network 215, and the EBT at acquirer 107.

In one instance, the competitors of an acquirer may be unwilling to support the benefits program model or may be unwilling to force the transaction to the acquirer's NYCE networks. For example, merchant (e.g., non-participating merchants 205) that do not utilize the acquirer's EBT program may be unable to engage with the program due to authorization-based exclusivity contracts with the competitors. The merchant may utilize various POS terminals, Independent software vendors (ISV), or switching systems prior to the authorization reaching the acquirer, and each authorization may need to be updated to support the creation or pass-through of the enhanced ISO message. As illustrated in FIG. 4, the non-participating merchants may send a standard message (e.g., non-enhanced data) to any acquirers 303 or ISV/Independent sales organizations (ISO) 409 that may forward the standard message to PPSA switch 405 or the issuer processor PPS 407 via regular networks 411 and 413.

As previously discussed, the existing merchant 105, ISV/ISO, and acquirer 107 are technically challenged in recognizing whether the card account requires a filtered spend program. There is also a concern regarding the privacy and compliance requirements of the unique items presented in the ISO message. The return message currently identifies values at the item and summary level (e.g., OTC, food, and other along with seven recently introduced additional defined public category values).

In one instance, non-participating merchants 205 may be invited to participate in the filtered spend program by routing the standard message through the switching systems (e.g., PPSA switch 405, Connex 403). The claimed invention identifies the requirement of a card account for a filtered spend program, addresses privacy concerns (e.g., data encryption or tokenization) and compliance requirements, and provides additional defined category values. For example, data encryption is a security method where information is encoded and can only be accessed or decrypted by a user with the correct encryption key. The data is encrypted when it is passed from the internal memory to external memory, and decrypted when it is read from external memory into the CPU or internal memory. The encryption schemes may use mathematical transformations and address location of the data as part of the transformation.

Figure 5:
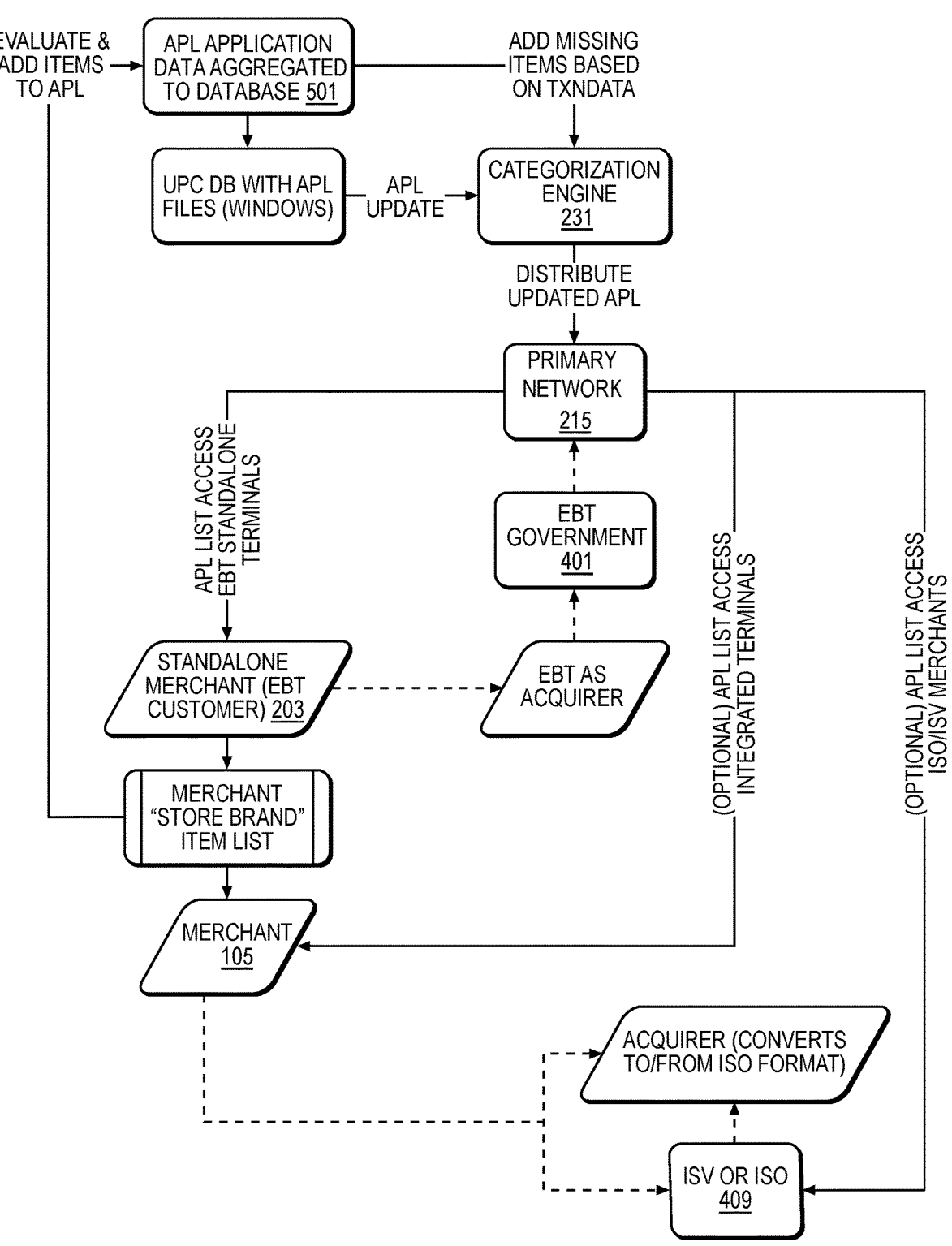
FIG. 5 is a flow diagram that illustrates an APL distribution, according to aspects of the disclosure.

FIG. 5 is a flow diagram that illustrates an APL distribution, according to aspects of the disclosure. In one example embodiment, one or more merchants (e.g., participating or standalone merchants) may provide inventory data for inclusion into an acquirer's database 501 to initiate their participation with a service (e.g., the filtered spend program). The inventory data may be evaluated by the categorization system(s) 127 and added to the APL. The APL is then aggregated to the acquirer's database 501 for periodic updates (e.g., missing items are added based on transaction data, updates based on UPC, etc.). The updated acquirer's database 501 is provided to categorization engine 231, and the categorization engine 231 may evaluate the inventory and provides applicable items to acquirer's database 501 with preferred categorization. In one instance, categorization engine 231 may create APL files which may be associated with the card programs for identifying items that are accepted by the program. The categorization engine 231 may distribute the updated APL files to the primary network 215 (e.g., NYCE).

In one instance, the primary network 215 may transmit the appropriate APL files to standalone merchant (e.g., self-categorizing merchants 203). The standalone merchant may transmit the received APL files to the integrated terminal associated with merchant 105. The standalone merchant may also transmit enhanced data, via EBT government 401, to the primary network 215. In another instance, the primary network 215 may transmit the appropriate APL files directly to the integrated terminal associated with merchant 105. In another instance, the primary network 215 may transmit the appropriate APL files to ISO/ISV 409.

Figure 6:
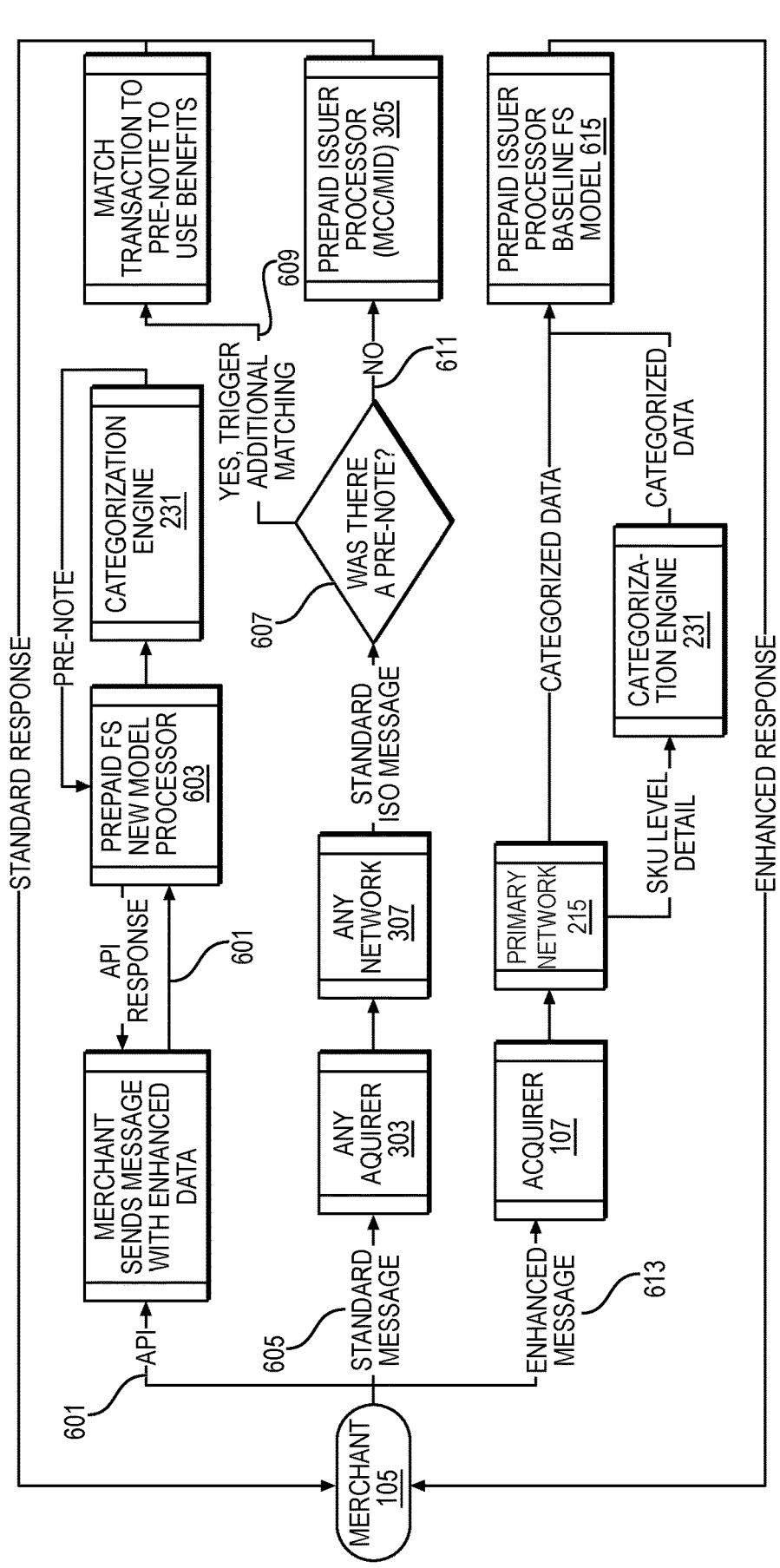
FIG. 6 is a flow diagram that illustrates a pre-note process in a filtered spend model, according to aspects of the disclosure.

FIG. 6 is a flow diagram that illustrate a pre-note process in a filtered spend model, according to aspects of the disclosure. In step 601, merchant 105 may transmit an API message containing enhanced data to issuer processor 603 (e.g., prepaid filtered spend (FS) new model processor) for pre-note processing. The issuer processor 603 may receive the pre-note and may select an appropriate categorization engine 231. The categorization engine 231 may process the API message and the pre-note, and may provide the issuer processor 603 with an adjudication evaluation, e.g., categorization result. The issuer processor 603 may store the adjudication evaluation and may transmit the evaluation to merchant 105. In one instance, issuer processor 603 may evaluate the pre-noted transactions and may hold funds of appropriate benefits. The issuer processor 603 may notify the merchant 105 of the result (e.g., the transaction has pre-approved items if they wish to proceed to do financial transactions, the transaction has a committed value that may be approved, etc.). In one instance, the issuer processor 603 may acknowledge the data to merchant 105. The acknowledgment may include an indication of the anticipated result (e.g., result and account balance by benefit if funds were evaluated). In one instance, the merchant 105 may opt to use returned data on receipt, with public categories (e.g., OTC, food, and any other categories).

In another instance, at step 605, merchant 105 may transmit a standard ISO message to any acquirers 303. Any acquirers 303 may transmit the standard ISO message to any network 307, whereupon the standard ISO message is processed to determine whether the message includes a pre-note (step 607). In one embodiment, the pre-note requirement may include:

TABLE 1

| Pre-Note Match Data Required | Data Repeated Per Item | Response Notations *Only if optional post note is provided to merchant |
|---|---|---|
| 1. Card reference 2. Merchant ID of the pre-note 3. Total Cart 4. Transaction reference | 1. Item Type (0-UPC, 1 = PLU, etc.) 2. Item value (15 characters) 3. Check Digit 4. Category & SubCategory Codes 5. Package Measure 6. Price, Discount, and Coupon values 7. # Units & Final Total Net Price | 1. Action Code per item 00 = Allowed, 01 = Approved*, 02 = Partial Approved*, 04 = Not on APL, 07 = Allowed but NSF* Benefit Type Used per item |

As illustrated in Table 1, the message may include pre-note match data including:

1. A card reference number that can tie the card account to the pre-note;
2. An identification information of the merchant sending the financial transaction data associated with the pre-note;
3. The total anticipated purchase price; and
4. Any type of transaction reference that matches the pre-note to the financial transaction.

As depicted in Table 1, the message for each item may include:

1. Indicator of the item type, e.g., universal product code (UPC), price look-up (PLC), national drug code (NDC), medical service code, or construction service code;
2. Item value is the identifier of the item, and may comprise of 15 characters;
3. Check digit is a validation for the items;
4. Any information that the merchant has in terms of category or subcategory for the codes is documented;
5. If the items come in a package, box, or are bundled together, then package measure is implemented.
6. Price per unit for the items is applied with discount and coupon values; and
7. The number of units and total net price of the items are determined.

As illustrated in Table 1, the message for response notations may include:

1. Whether the item was:
   allowed;
   approved, if the items were allowed and covered;
   partially approved, if there was not enough money to cover the transaction;
   not on APL, if the item is not recognized and it not in the approved list; or
   something that is allowed but not sufficient funds (NSF).

In step 609, upon determining the standard ISO message includes a pre-note, the pre-note platform or the issuer processor 603 may match the pre-note and apply the transaction to the appropriate benefit set based on that pre-note. In step 611, upon determining the standard ISO message does not include a pre-note, the data processing platform 117 (e.g., authorization system 129) may transmit the standard ISO message to pre-paid issuer processor 305 or reversed without being used. In another instance, a post-note may be provided to the categorization engine 231. In another instance, to provide for "prescriptive" or coupon enablement.

In another instance, at step 613, merchant 105 (e.g., participating merchants) may send an enhanced ISO message to acquirer 107. The acquirer 107 may route the ISO message to the primary network 215 (e.g., NYCE). Depending on the content, the ISO message is either routed directly to issuer processor 615 or passed through the categorization engine 231 for substantiation and then to issuer processor 615. The issuer processor 615 may determine whether the funds are available to cover the categorized items and respond to the network, the acquirer 107, and merchant 105 with an approval, partial approval, or decline response indicating the subtotal of the transaction that was covered by the public category. Merchant 105 may opt to use returned data on receipt, with public categories OTC, food, and any other categories.

Figure 7:
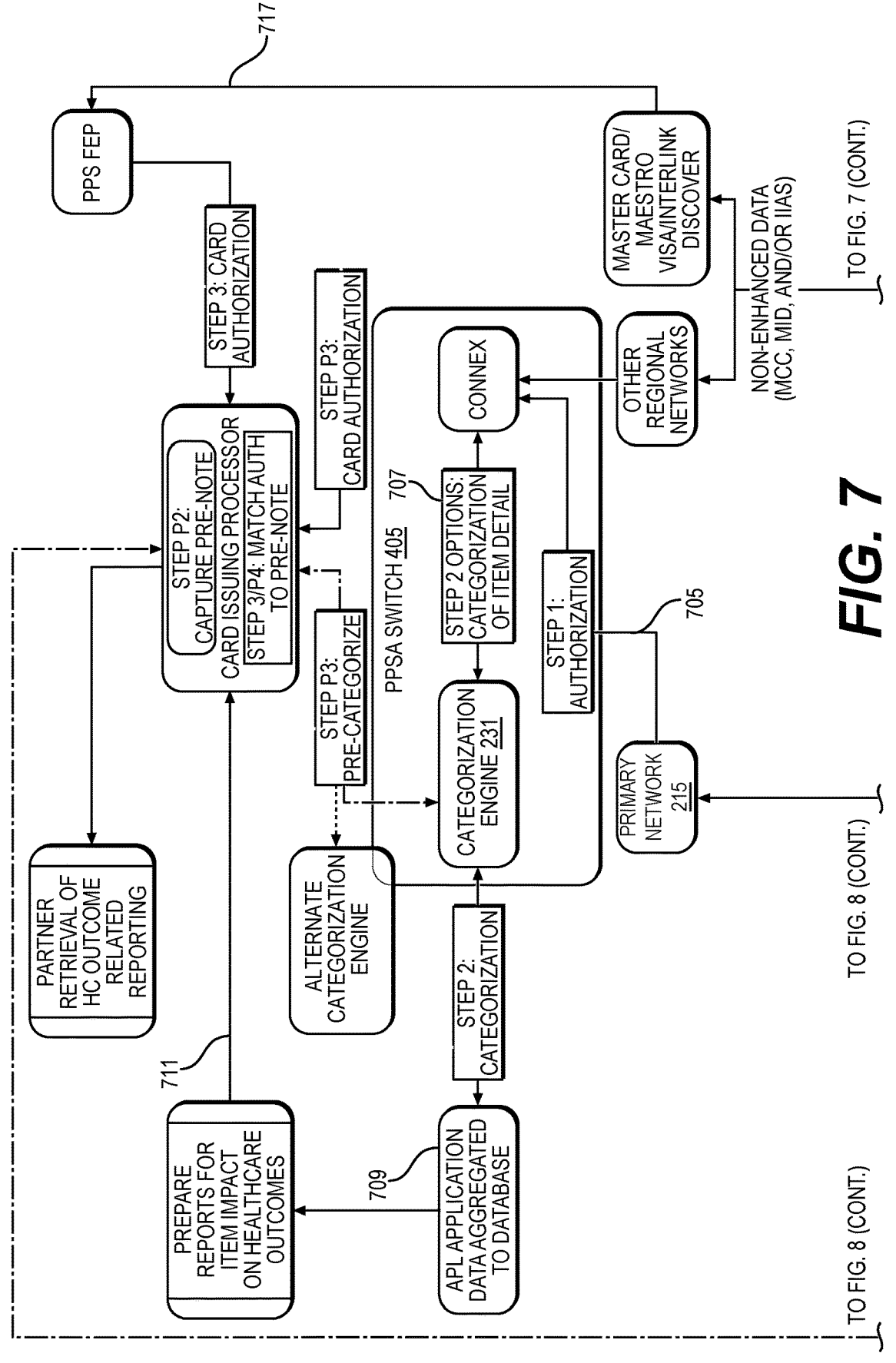
FIG. 7 is a diagram that illustrates an infrastructure for receiving filterable data prior to, and outside of, the network authorization request with similar service level objective (SLO) performance, according to aspects of the disclosure.
Figure 7:
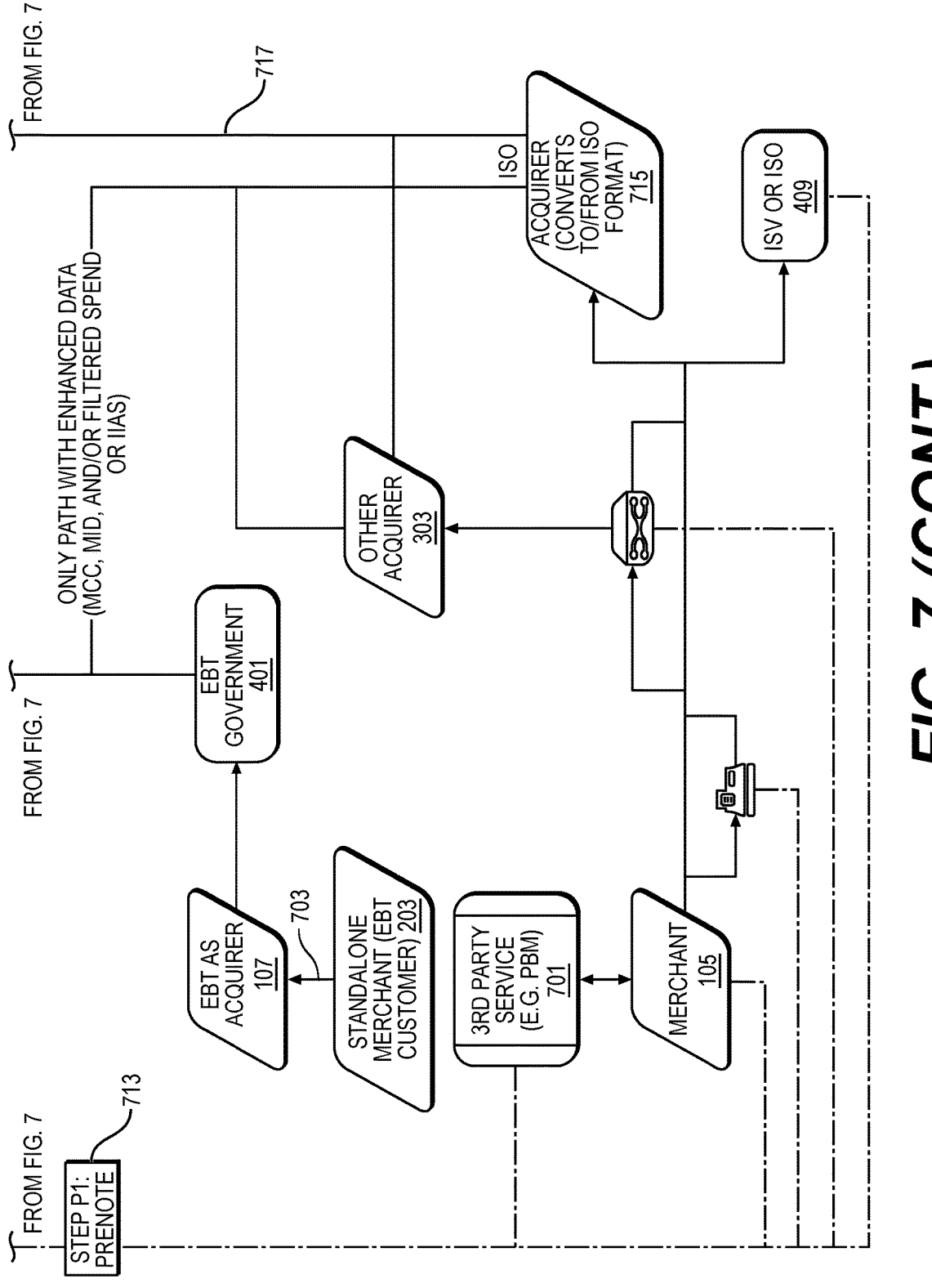

FIG. 7 is a diagram that illustrates an infrastructure for receiving filterable data prior to, and outside of, the network authorization request with similar service level objective (SLO) performance, according to aspects of the disclosure. In one instance, the request may originate from merchant 105, third-party services (e.g., PBM) 701, standalone merchant 203, POS provider, a switch, or an ISV. In step 703, the request is transmitted to an acquirer 107, whereupon the acquirer 107 may process and route the request, via EBT government 401, to the primary network 215 (e.g., NYCE). In step 705, the primary network 215 may transmit the request to the PPSA switch 405 for authorization. In step 707, the categorization engine 231 of the PPSA switch 405 may process the request for item-level detail which can be adjudicated in advance of the authorization request. The categorization engine 231 may analyze and categorize the data (e.g., card data), and transmit the analyzed and categorized data. In step 709, the categorized data may be aggregated and saved in the database, and the report regarding the adjudication of the data is then transmitted to the processor (step 711).

Merchant 105 may receive an acknowledgment before sending the authorization request. In one instance, a response to the pre-note is sent back to the categorization engine 231 and/or the merchant 105 to indicate the covered items based on actual balance and benefits availability. In step 713, the message including a pre-note is transmitted to the card issuing processor. The card issuing processor may process the message to capture the pre-note, and may match the pre-note and apply the transaction to the appropriate benefit set based on that pre-note. In one instance, the pre-note has a finite life that shall default (e.g., up to 30 minutes for retail), although the hold time may vary based on the source of the pre-note (i.e., gaps from pre-note to authorization). In one instance, there is an option to reserve funds for some pre-notes.

In another instance, merchant 105 may transmit a request (e.g., non-enhanced data) to any acquirers 303, acquirer converts to or from ISO format 715, and/or ISO/ISV 409. In step 717, the request is transmitted, via regional networks, to the card issuing processor for authorization. During authorization, the card issuing processor may utilize the filtered spend data received within the ISO message, if available. The card issuing processor may attempt to match and apply a pre-note for the account, if any. Otherwise, the card issuing processor may apply any exceptions configured before considering a non-filtered approach. The card issuing processor may authenticate or reject the card authorization. In one instance, PPS may maintain the existing infrastructure to support non-filtered spend transactions and filtered spend transactions via an ISO authorization message. The pre-note program does not impact the participating merchants as they do not need to make any changes to their operations. Furthermore, the pre-note program does not impact non-participating merchants as they have not shared any data with the program.

Figure 8:
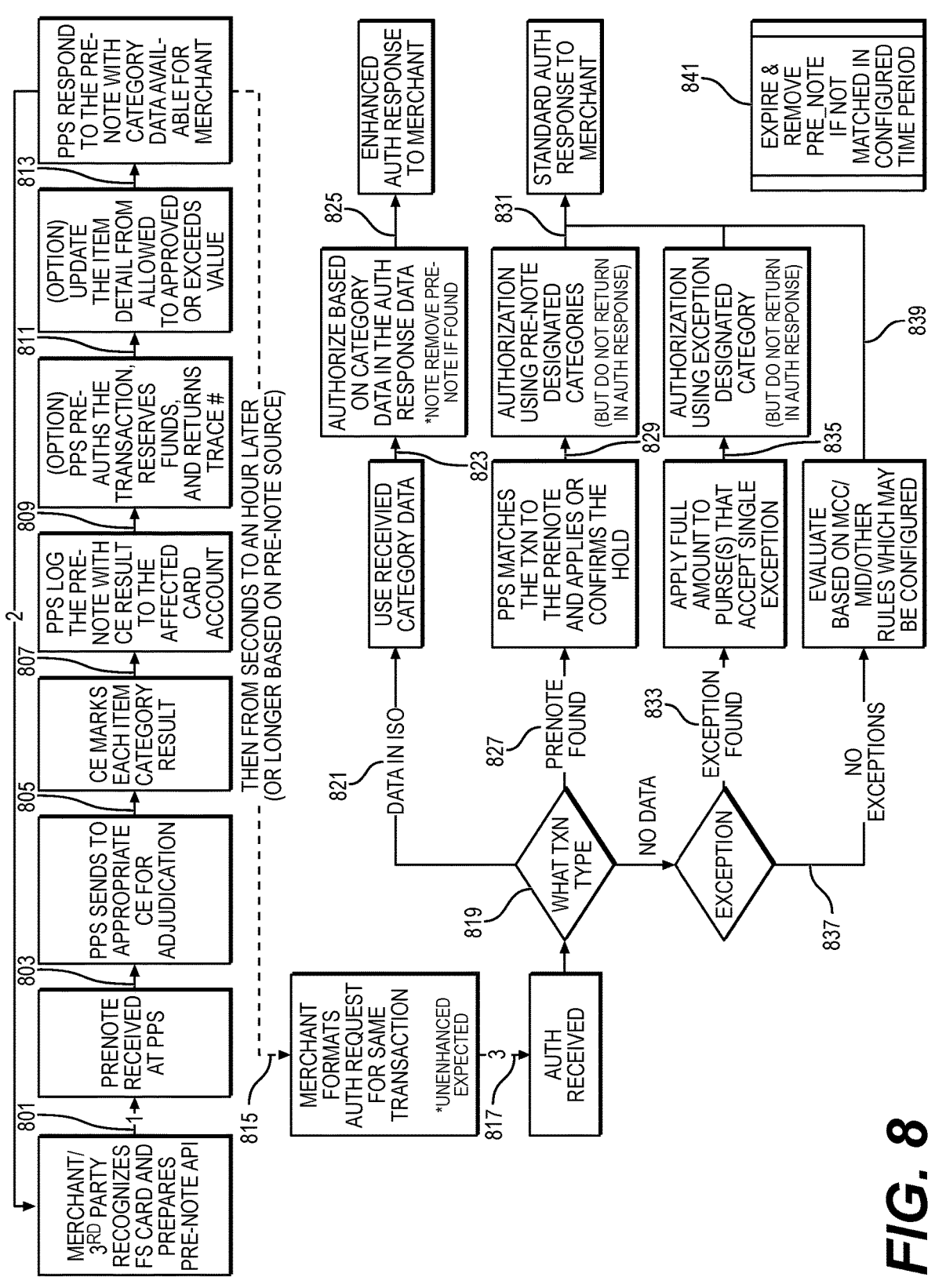
FIG. 8 is a diagram that illustrates a message flow for a filter spend (FS) program, according to aspects of the disclosure.

FIG. 8 is a diagram that illustrates a message flow for a filter spend (FS) program, according to aspects of the disclosure. Although FIG. 8 is illustrated and described as a sequence of steps, it is contemplated that various embodiments of this process may be performed in any order or combination and need not include all of the illustrated steps. In step 801, a merchant 105 or third-party service provider (e.g., 701) may recognize a filter spend (FS) card (e.g., access device 101) and may prepare a pre-note API message for transmittal to the PPS (e.g., PPS module 121 of the pre-note platform 115). In step 803, the PPS may receive the pre-note and may send the pre-note to the appropriate categorization engine 231 for adjudication.

In step 805, the categorization engine 231 may mark each item with a category result. In step 807, the PPS may log the pre-note with the categorization engine's result to the affected card account. Optionally, the PPS may pre-authorize the transaction, reserve funds, and return the trace number (step 809). Optionally, the PPS may allow updating of the item detail from allowed to approved or exceeds value (step 811). In step 813, the PPS may respond to the pre-note with category data available for merchants. In step 815, the merchant formats the authorization request for the same transactions. In step 817, the data processing platform 117 receives the authorization.

In step 819, the data processing platform 117 may process the transaction to determine its type. In step 821, the transaction is determined to include filtered spend data in the ISO message and may use received category data. In step 823, the merchant and the transaction may be authorized based, at least in part, on category data in the authorized response data. In step 825, an enhanced authorization response is provided to the merchant 105.

In step 827, the data processing platform 117 may process the transaction to determine the transaction includes a pre-note, whereupon the PPS may match the pre-note and apply the transaction to the appropriate benefit set based on the pre-note. In step 829, the transaction is authorized using pre-note designated categories. In step 831, a standard authorization response is provided to merchants.

In step 833, the data processing platform 117 may process the transaction to determine the transaction does not include any filtered spend data. The data processing platform 117 may determine whether an exception is found for the transaction. Upon finding an exception, the data processing platform 117 may apply the full amount to the purse(s) that accept a single exception. In step 835, an authorization using exception designated category is provided. Thereafter, a standard authorization response is provided to merchants.

In step 837, an exception is not found in the transaction, whereupon the merchant and transaction may be evaluated based on the MCC, the MID, or any other rules which may be configured. Thereafter, a standard authorization response is provided to the merchants (step 839).

In step 841, if the pre-note is not matched within a configured time period, the pre-note expires and is removed.

Figure 9:
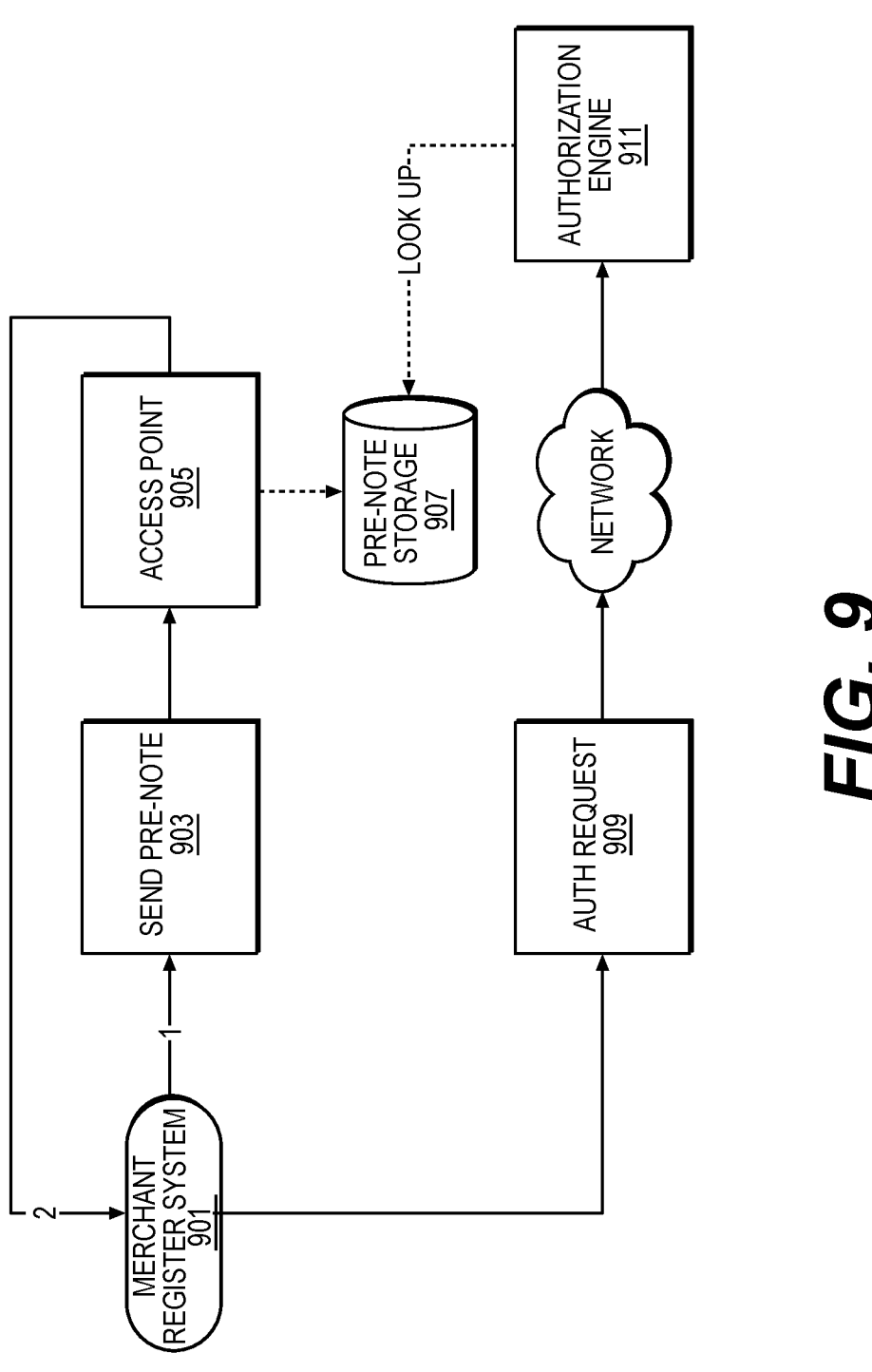
FIG. 9 is a diagram that illustrates an implementation of the FS program to a merchant register system, according to aspects of the disclosure.

FIG. 9 is a diagram that illustrates an implementation of a filtered spend (FS) program to a merchant register system, according to aspects of the disclosure. In one instance, payment facilitators may pre-analyze transactional data by providing a separate interface from a pre-processor that operates from days to seconds before the purchase. A payment page is provided that integrates a merchant register system 901 of a vendor (e.g., Gocart or any other service providers) as the payment method. The payment page is upgraded to capture item details and enable the payment method flow to send pre-note 903 to an access point 905. The access point 905 may process and store the pre-note 903 in the pre-note storage 907 per the methods described herein.

In one instance, the provider may confirm that merchant register system 901 will wait for the pre-processor before sending an actual ISO payment request. The payment sequence is updated to follow the pre-note acknowledgment with the actual payment request to merchant register system 901. Thereafter, merchant register system 901 may send an authorization request 909 to an authorization engine 911. The authorization engine 911 may approve or deny the authorization request by querying the pre-note storage 907 for the pre-note 903. It allows the deployment of the product for online merchants. In one instance, the merchant types include merchants supported through a shopping cart model, service-oriented businesses such as medical offices that utilize a PC-based invoice system, prepared meal providers, etc.

Figure 10:
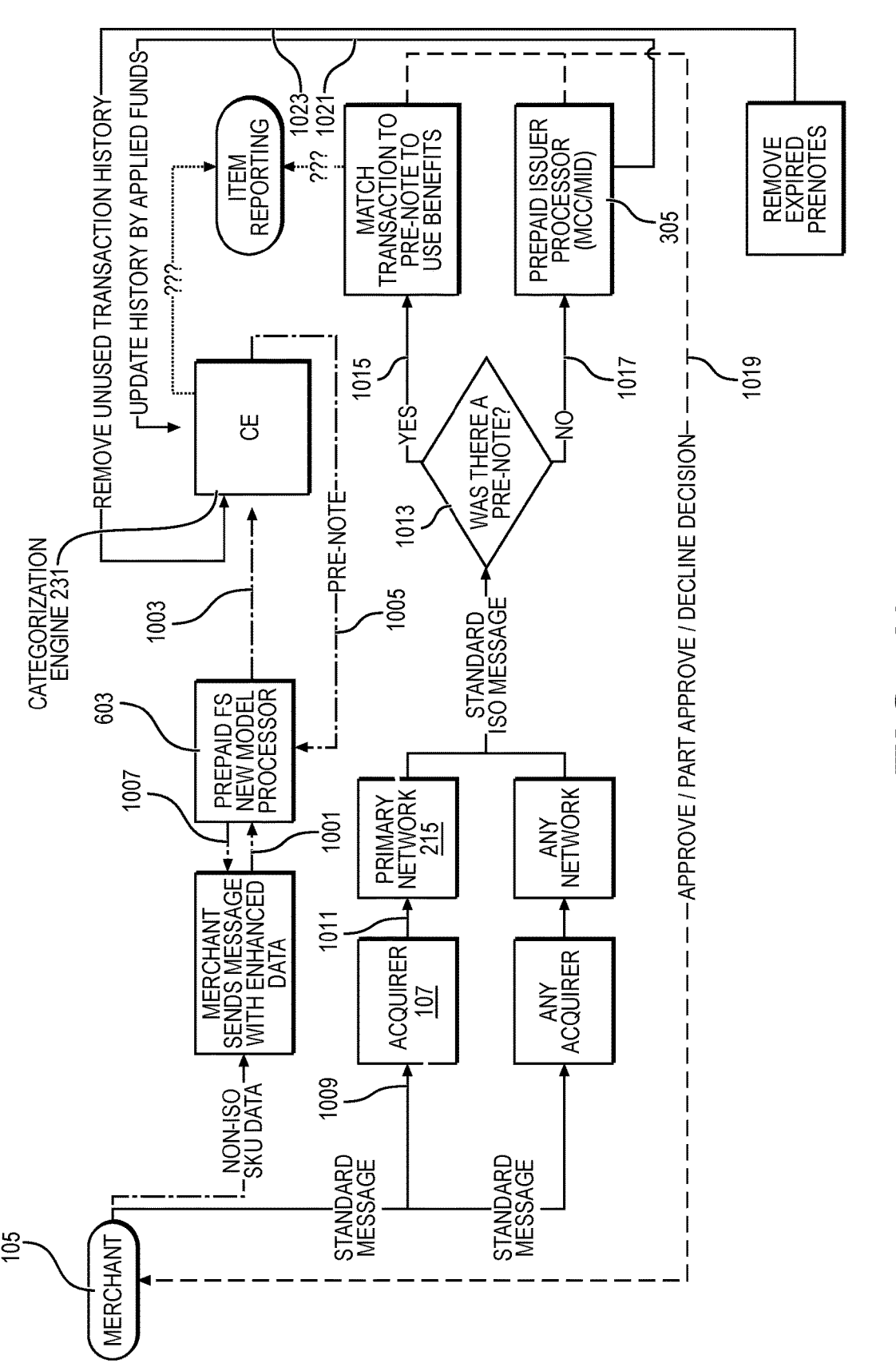
FIG. 10 is a flow diagram that illustrates a pre-note process for filtered spend transactions, according to aspects of the disclosure.

FIG. 10 is a flow diagram that illustrates a pre-note process for filtered spend transactions, according to aspects of the disclosure. In step 1001, merchant 105 may send a message with enhanced data to issuer processor 603 (e.g., prepaid filtered spend (FS) new model processor) for processing. The issuer processor 603 may process a pre-note request for categorization (PPS) to identify a proxy (and if the option employed the available categories), reference identification (ID), and/or a tracking number for the pre-note to be included in the API.

In step 1003, the issuer processor 603 may send the categorization request to the categorization engine 231 (e.g., outside of the authorization flow). The categorization request may include the card proxy, the reference ID, and the item details to be categorized. The categorization request may indicate the initiation of a new categorization, updating/re-categorizing a previously categorized transaction, or deleting/canceling prior categorization data for the referenced proxy and referenced ID. In one instance, the categorization engine 231 may be updated, per requirement, to support the items in the input payload, categorize them, markup the items by category under which they fall, and aggregate the total request by category in a summary block that can accommodate more than 12 categories. The categorization engine 231 may process the categorization request and the pre-note, and may provide the issuer processor 603 with an adjudication evaluation, e.g., categorization result.

In step 1005, the issuer processor 603 may receive a categorization response, e.g., a response with more than 12 categories may be stored. In one instance, the issuer processor 603 may update the ability to store categories related to a transaction from 12 to 25. The issuer processor 603 may log the categorization response as a pre-note to the proxy's PAN. For example, the pre-note for the request type initial may be logged to the card account, the pre-note for request type update may replace the original pre-note (with history), or the pre-note for request type delete may remove the original pre-note (with history) (step 1007). In one instance, the issuer processor 603 may perform error handling upon determining the pre-note for request type update/delete is not found.

In another instance, at step 1009, the merchant 105 may transmit a standard ISO message to acquirer 107. In step 1011, the acquirer 107 may transmit the standard ISO message to primary network 215 (e.g., NYCE), whereupon the standard ISO message is processed to determine whether the message includes a pre-note (step 1013). In step 1015, upon determining the standard ISO message includes a pre-note, the issuer processor 603 may match the pre-note and apply the transaction to the appropriate benefit set based on that pre-note. In step 1017, upon determining the standard ISO message does not include a pre-note, the pre-paid issuer processor 305 will continue to process the message. In step 1019, the pre-paid issuer processor 305 may determine whether funds are available to cover the categorized items and respond to merchant 105 with approval, partial approval, or declined response. Subsequently, categorization engine 231 may update transaction history based on the applied funds (step 1021) or remove unused transaction history and/or pre-notes per the methods described herein (step 1023).

FIG. 11 is a flowchart of a process 1100 for a pre-note process in an online communication (e.g., online transaction for a filtered spend program), according to aspects of the disclosure. In various embodiments, the pre-note platform 115 and/or the data processing platform 117 may perform one or more portions of the process 1100 and are implemented using, for instance, a chip set including a processor and a memory as shown in FIG. 13. As such, the pre-note platform 115 and/or the data processing platform 117 provide means for accomplishing various parts of the process 1100, as well as means for accomplishing embodiments of other processes described herein in conjunction with other components of the system 100. Although the process 1100 is illustrated and described as a sequence of steps, it is contemplated that various embodiments of the process 1100 are performed in any order or combination and need not include all of the illustrated steps.

In step 1101, the switching system(s) 113 via processor 1302, may receive a request (e.g., a transaction request) from the access device 101 utilizing transaction network 109.

In step 1103, the switching system(s) 113 via processor 1302, may process the transaction request to determine the request type and the request content. The request type and the content may include enhanced data. The enhanced data may include stock keeping unit (SKU) level data that provide unique identifiers for each of the items in the transaction request from the access device 101.

In step 1105, the switching system(s) 113 via processor 1302, may initiate the pre-note process by transmitting the transaction request to the pre-note platform 115 upon determining the transaction request includes enhanced data. The pre-note platform 115 may search for the pre-note associated with the transaction request and the access device 101 in a database (e.g., a pre-note database). The pre-note platform 115 may match the pre-note to the transaction request and the access device 101 to apply one or more benefits associated with the pre-note. The pre-note may include access device information, a reference identification, and/or item details for categorization. The pre-note may also include a new categorization request for the one or more items, an update request for re-categorizing categorized items, and/or a remove request to cancel the categorization of the one or more items. The pre-note platform 115 may transmit the transaction request with the pre-note to the data processing platform 117.

In another embodiment, the pre-note platform 115 may determine one or more pre-notes in the database are unmatched to a plurality of requests and a plurality of access devices for a pre-determined time threshold. The pre-note platform 115 may deactivate one or more pre-notes, and may remove the one or more pre-notes from the database. The pre-note platform 115 may communicate such deactivation to the data processing platform 117.

In step 1107, the categorization system(s) 127 of the data processing platform 117 via processor 1302, may categorize one or more items associated with the transaction request into one or more categories based on the pre-note. In one instance, the categorization system(s) 127 may receive the transaction request with the pre-note. The categorization system(s) 127 may process the transaction request with the pre-note to check category values, subcategory values, and/or benefits associated with one or more items in the database. The categorization system(s) 127 may generate an adjudication evaluation for the transaction request with the pre-note. In one instance, the adjudication evaluation includes categorizing one or more items into one or more categories, updating the one or more categories in the database, tracking at least one item identified in the request, and/or reporting and analyzing the one or more items in the database and associated with the request. In one instance, updating one or more categories in the database by the categorization system(s) 127 may include annotating one or more items based on one or more categories. The categorization system(s) 127 may also increase the capability to store additional categories (e.g., more than 12 categories) and the number of items to accommodate a plurality of requests (e.g., up to 100).

In step 1109, data processing platform 117 via processor 1302, may execute the request based on one or more categories. The data processing platform 117 may analyze the categorized items, and then transmit the analyzed and categorized items for authorization to the authorization system(s) 129. The authorization system(s) 129 may authorize the items and the transaction request, whereupon the authorization response is transmitted to the participating entity (e.g., issuer system(s) 111) to complete the request. In one instance, the notification module 125 identifies the authorized requests that match the pre-note. Then, the notification module 125 may generate one or more reports in a user interface of a device associated with the participating entity (e.g., customer, merchants, etc.), wherein one or more reports include pre-note activities.

One or more implementations disclosed herein include and/or are implemented using a machine learning model. For example, one or more of the components of the rules engine 119, e.g., the machine learning module 137, are implemented using a machine learning model and/or are used to train the machine learning model. A given machine learning model is trained using the training flow chart 1200 of FIG. 12. Training data 1212 includes one or more of stage inputs 1214 and known outcomes 1218 related to the machine learning model to be trained. Stage inputs 1214 are from any applicable source including text, visual representations, data, values, comparisons, and stage outputs, e.g., one or more outputs from one or more steps from FIG. 11. The known outcomes 1218 are included for the machine learning models generated based on supervised or semi-supervised training. An unsupervised machine learning model may not be trained using known outcomes 1218.

Known outcomes 1218 includes known or desired outputs for future inputs similar to or in the same category as stage inputs 1214 that do not have corresponding known outputs.

The training data 1212 and a training algorithm 1220, e.g., one or more of the modules implemented using the machine learning model and/or are used to train the machine learning model, is provided to a training component 1230 that applies the training data 1212 to the training algorithm 1220 to generate the machine learning model. According to an implementation, the training component 1230 is provided comparison results 1216 that compare a previous output of the corresponding machine learning model to apply the previous result to re-train the machine learning model. The comparison results 1216 are used by training component 1230 to update the corresponding machine learning model. The training algorithm 1220 utilizes machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data. Similarly, a layer is updated, added, or removed based on training data/and or input data. The resulting outputs are adjusted based on the adjusted weights and/or layers.

In general, any process or operation discussed in this disclosure is understood to be computer-implementable, such as the process illustrated in FIG. 11 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

FIG. 13 illustrates an implementation of a computer system that executes techniques presented herein. The computer system 1300 includes a set of instructions that are executed to cause the computer system 1300 to perform any one or more of the methods or computer based functions disclosed herein. The computer system 1300 operates as a standalone device or is connected, e.g., using a network, to other computer systems or peripheral devices.

Unless specifically stated otherwise, as apparent from the following discussions, it is appreciated that throughout the specification, discussions utilizing terms such as "process-ing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 1300 operates in the capacity of a server or as a client user computer in a server-client user network environment, or as a peer computer system in a peer-to-peer (or distributed) network environment. The computer system 1300 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1300 is implemented using electronic devices that provide voice, video, or data communication. Further, while the computer system 1300 is illustrated as a single system, the term "system" shall also be taken to include any collection of systems or sub-systems that individually or jointly execute a set, or multiple sets, of instructions to perform one or more computer functions.

As illustrated in FIG. 13, the computer system 1300 includes a processor 1302, e.g., a central processing unit (CPU), a graphics processing unit (GPU), or both. The processor 1302 is a component in a variety of systems. For example, the processor 1302 is part of a standard personal computer or a workstation. The processor 1302 is one or more processors, digital signal processors, application specific integrated circuits, field programmable gate arrays, servers, networks, digital circuits, analog circuits, combinations thereof, or other now known or later developed devices for analyzing and processing data. The processor 1302 implements a software program, such as code generated manually (i.e., programmed).

The computer system 1300 includes a memory 1304 that communicates via bus 1308. Memory 1304 is a main memory, a static memory, or a dynamic memory. Memory 1304 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1304 includes a cache or random-access memory for the processor 1302. In alternative implementations, the memory 1304 is separate from the processor 1302, such as a cache memory of a processor, the system memory, or other memory. Memory 1304 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 1304 is operable to store instructions executable by the processor 1302. The functions, acts, or tasks illustrated in the figures or described herein are performed by processor 1302 executing the instructions stored in memory 1304. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 1300 further includes a display 1310, such as a liquid crystal display (LCD), an organic light emitting diode (OLED), a flat panel display, a solid-state display, a cathode ray tube (CRT), a projector, a printer or other now known or later developed display device for outputting determined information. The display 1310 acts as an interface for the user to see the functioning of the processor 1302, or specifically as an interface with the software stored in the memory 1304 or in the drive unit 1306.

Additionally or alternatively, the computer system 1300 includes an input/output device 1312 configured to allow a user to interact with any of the components of the computer system 1300. The input/output device 1312 is a number pad, a keyboard, a cursor control device, such as a mouse, a joystick, touch screen display, remote control, or any other device operative to interact with the computer system 1300.

The computer system 1300 also includes the drive unit 1306 implemented as a disk or optical drive. The drive unit 1306 includes a computer-readable medium 1322 in which one or more sets of instructions 1324, e.g. software, is embedded. Further, the sets of instructions 1324 embodies one or more of the methods or logic as described herein. Instructions 1324 resides completely or partially within memory 1304 and/or within processor 1302 during execution by the computer system 1300. The memory 1304 and the processor 1302 also include computer-readable media as discussed above.

In some systems, computer-readable medium 1322 includes the set of instructions 1324 or receives and executes the set of instructions 1324 responsive to a propagated signal so that a device connected to network 1330 communicates voice, video, audio, images, or any other data over network 1330. Further, the sets of instructions 1324 are transmitted or received over the network 1330 via the communication port or interface 1320, and/or using the bus 1308. The communication port or interface 1320 is a part of the processor 1302 or is a separate component. The communication port or interface 1320 is created in software or is a physical connection in hardware. The communication port or interface 1320 is configured to connect with the network 1330, external media, display 1310, or any other components in the computer system 1300, or combinations thereof. The connection with network 1330 is a physical connection, such as a wired Ethernet connection, or is established wirelessly as discussed below. Likewise, the additional connections with other components of the computer system 1300 are physical connections or are established wirelessly. Network 1330 alternatively be directly connected to the bus 1308.

While the computer-readable medium 1322 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 1322 is non-transitory, and may be tangible.

The computer-readable medium 1322 includes a solid-state memory such as a memory card or other package that houses one or more non-volatile read-only memories. The computer-readable medium 1322 is a random-access memory or other volatile re-writable memory. Additionally or alternatively, the computer-readable medium 1322 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 1300 is connected to network 1330. Network 1330 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. Network 1330 includes wide area networks (WAN), such as the Internet, local area networks (LAN), campus area networks, metropolitan area networks, a direct connection such as through a Universal Serial Bus (USB) port, or any other networks that allows for data communication. Network 1330 is configured to couple one computing device to another computing device to enable communication of data between the devices. Network 1330 is generally enabled to employ any form of machine-readable media for communicating information from one device to another. Network 1330 includes communication methods by which information travels between computing devices. Network 1330 is divided into sub-networks. The sub-networks allow access to all of the other components connected thereto or the sub-networks restrict access between the components. Network 1330 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention are practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications are made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for a pre-note process in an online communication, the method comprising:
   receiving, by one or more processors, a request from an access device;
   processing, by the one or more processors, the request to determine a request type and a request content;
   initiating, by the one or more processors, the pre-note process for the request based on the request type and the request content, wherein a pre-note includes access device information, a reference identification, and/or item details for categorization;
   categorizing, by the one or more processors, one or more items associated with the request into one or more categories based on the pre-note;
   executing, by the one or more processors, the request based on the one or more categories;
   receiving, by the one or more processors, a second request from the access device, wherein the second request omits an enhanced data providing a unique identifier for at least one item;
   identifying, by the one or more processors a matching, preexisting pre-note for the second request, wherein the matching, preexisting pre-note is based on a primary account number of a card accessing the access device; and
   executing, by the one or more processors, the second request.

2. The computer-implemented method of claim 1, wherein initiating the pre-note process for the request, further comprises:
   searching, by the one or more processors, for the pre-note associated with the request and the access device in a database; and
   matching, by the one or more processors, the pre-note to the access device to apply one or more benefits associated with the pre-note.

3. The computer-implemented method of claim 2, wherein initiating the pre-note process for the request, further comprises:

determining, by the one or more processors, one or more pre-notes in the database are unmatched to a plurality of requests and a plurality of access devices for a pre-determined time threshold;

deactivating, by the one or more processors, the one or more pre-notes; and removing, by the one or more processors, the one or more pre-notes in the database.

4. The computer-implemented method of claim 2, wherein categorizing the one or more items into the one or more categories based on the pre-note, further comprises:

receiving, by the one or more processors, the request with the pre-note;

processing, by the one or more processors, the request with the pre-note to check category values and subcategory values associated with the one or more items in the database; and generating, by the one or more processors, an adjudication evaluation for the request with the pre-note.

5. The computer-implemented method of claim 4, wherein generating the adjudication evaluation, further comprises:

causing, by the one or more processors, the categorization of the one or more items into the one or more categories, an updating of the one or more categories in the database, a tracking of at least one item identified in the request, and/or a reporting and an analysis of the one or more items in the database and associated with the request.

6. The computer-implemented method of claim 5, wherein updating of the one or more categories in the database, further comprises:

annotating, by the one or more processors, the one or more items based on the one or more categories; and increasing, by the one or more processors, capability to store additional categories and number of items to accommodate a plurality of requests.

7. The computer-implemented method of claim 1, wherein executing the request based on the one or more categories, further comprises:

analyzing, by the one or more processors, the categorized items;

transmitting, by the one or more processors, the analyzed and categorized items for authorization; and transmitting, by the one or more processors, a response to the analyzed and categorized items to a participating entity to complete the request.

8. The computer-implemented method of claim 7, further comprising:

identifying, by the one or more processors, the authorized requests that match the pre-note; and generating, by the one or more processors, one or more reports in a user interface of a device associated with the participating entity, wherein the one or more reports include pre-note activities.

9. The computer-implemented method of claim 1, wherein the pre-note includes a new categorization request for the one or more items, an update request for re-categorizing categorized items, or a remove request to cancel the categorization of the one or more items.

10. The computer-implemented method of claim 1, wherein the request type includes an enhanced data, and wherein the enhanced data includes stock keeping unit level data that provide unique identifiers for each of the one or more items.

11. A system for a pre-note process in an online communication, comprising:

one or more processors; and at least one non-transitory computer readable medium storing instructions which, when executed by the one or more processors, cause the one or more processors to perform operations comprising:

receiving a request from an access device;

processing the request to determine a request type and a request content;

initiating the pre-note process for the request based on the request type and the request content, wherein a pre-note includes access device information, a reference identification, and/or item details for categorization;

categorizing one or more items associated with the request into one or more categories based on the pre-note;

executing the request based on the one or more categories;

receiving, by the one or more processors, a second request from the access device, wherein the second request omits an enhanced data providing a unique identifier for at least one item;

identifying, by the one or more processors a matching, preexisting pre-note for the second request, wherein the matching, preexisting pre-note is based on a primary account number of a card accessing the access device; and executing, by the one or more processors, the second request.

12. The system of claim 11, wherein initiating the pre-note process for the request, further comprises:

searching for the pre-note associated with the request and the access device in a database; and matching the pre-note to the access device to apply one or more benefits associated with the pre-note.

13. The system of claim 12, wherein initiating the pre-note process for the request, further comprises:

determining one or more pre-notes in the database are unmatched to a plurality of requests and a plurality of access devices for a pre-determined time threshold;

deactivating the one or more pre-notes; and removing the one or more pre-notes in the database.

14. The system of claim 12, wherein categorizing the one or more items into the one or more categories based on the pre-note, further comprises:

receiving the request with the pre-note;

processing the request with the pre-note to check category values and subcategory values associated with the one or more items in the database; and generating an adjudication evaluation for the request with the pre-note.

15. The system of claim 14, wherein generating the adjudication evaluation, further comprises:

causing the categorization of the one or more items into the one or more categories, an updating of the one or more categories in the database, a tracking of at least one item identified in the request, and/or a reporting and an analysis of the one or more items in the database and associated with the request.

16. The system of claim 15, wherein updating of the one or more categories in the database, further comprises:

annotating the one or more items based on the one or more categories; and increasing capability to store additional categories and number of items to accommodate a plurality of requests.

17. The system of claim 11, wherein executing the request based on the one or more categories, further comprises:

analyzing the categorized items;

transmitting the analyzed and categorized items for authorization; and transmitting a response to the analyzed and categorized items to a participating entity to complete the request.

18. A non-transitory computer readable medium for a pre-note process in an online communication, the non-transitory computer readable medium storing instructions which, when executed by one or more processors, cause the one or more processors to perform operations comprising:

receiving a request from an access device;

processing the request to determine a request type and a request content;

initiating the pre-note process for the request based on the request type and the request content, wherein a pre-note includes access device information, a reference identification, and/or item details for categorization;

categorizing one or more items associated with the request into one or more categories based on the pre-note;

executing the request based on the one or more categories;

receiving, by the one or more processors, a second request from the access device, wherein the second request omits an enhanced data providing a unique identifier for at least one item;

identifying, by the one or more processors a matching, preexisting pre-note for the second request, wherein the matching, preexisting pre-note is based on a primary account number of a card accessing the access device; and executing, by the one or more processors, the second request.

19. The non-transitory computer readable medium of claim 18, wherein initiating the pre-note process for the request, further comprises:

searching for the pre-note associated with the request and the access device in a database; and matching the pre-note to the access device to apply one or more benefits associated with the pre-note.

20. The non-transitory computer readable medium of claim 19, wherein initiating the pre-note process for the request, further comprises:

determining, by the one or more processors, one or more pre-notes in the database are unmatched to a plurality of requests and a plurality of access devices for a pre-determined time threshold;

deactivating, by the one or more processors, the one or more pre-notes; and removing, by the one or more processors, the one or more pre-notes in the database.

* * * * *